(12) United States Patent
Garg et al.

(10) Patent No.: US 10,877,977 B2
(45) Date of Patent: Dec. 29, 2020

(54) GENERATING A RELEVANCE SCORE FOR DIRECT DIGITAL MESSAGES BASED ON CROWDSOURCED INFORMATION AND SOCIAL-NETWORK SIGNALS

(71) Applicant: Facebook, Inc., Menlo Park, CA (US)

(72) Inventors: Vivek Garg, Seattle, WA (US); Li Hua, Bellevue, WA (US); Zheng Fang, Bellevue, WA (US)

(73) Assignee: FACEBOOK, INC., Menlo Park, CA (US)

( * ) Notice: Subject to any disclaimer, the term of this patent is extended or adjusted under 35 U.S.C. 154(b) by 103 days.

(21) Appl. No.: 15/793,847

(22) Filed: Oct. 25, 2017

(65) Prior Publication Data
US 2019/0121866 A1    Apr. 25, 2019

(51) Int. Cl.
| | |
|---|---|
| G06F 16/2457 | (2019.01) |
| G06Q 50/00 | (2012.01) |
| H04L 12/58 | (2006.01) |
| G06F 16/9535 | (2019.01) |
| H04L 29/06 | (2006.01) |

(52) U.S. Cl.
CPC .... *G06F 16/24578* (2019.01); *G06F 16/9535* (2019.01); *G06Q 50/01* (2013.01); *H04L 51/046* (2013.01); *H04L 51/12* (2013.01); *H04L 51/16* (2013.01); *H04L 51/32* (2013.01); *H04L 63/0227* (2013.01)

(58) Field of Classification Search
CPC .......... G06F 16/24578; G06F 16/9535; G06Q 50/01; H04L 51/00; H04L 51/046; H04L 51/12; H04L 51/14; H04L 51/32; H04L 63/0227
See application file for complete search history.

(56) References Cited

U.S. PATENT DOCUMENTS

| | | | | |
|---|---|---|---|---|
| 6,480,885 | B1 * | 11/2002 | Olivier | H04L 12/1859 709/202 |
| 7,831,684 | B1 * | 11/2010 | Lawler | G06Q 10/10 709/200 |
| 8,739,016 | B1 * | 5/2014 | Goldman | G06F 16/951 715/200 |
| 8,805,937 | B2 * | 8/2014 | Bendel | G06Q 10/107 709/206 |
| 9,705,885 | B2 * | 7/2017 | Erdal | G06Q 50/01 |
| 10,277,628 | B1 * | 4/2019 | Jakobsson | H04L 63/1483 |
| 2005/0204005 | A1 * | 9/2005 | Purcell | G06Q 10/107 709/206 |
| 2007/0027992 | A1 * | 2/2007 | Judge | G06Q 10/107 709/227 |

(Continued)

*Primary Examiner* — James R Sheleheda
(74) *Attorney, Agent, or Firm* — Keller Jolley Preece

(57) ABSTRACT

This disclosure covers methods, non-transitory computer readable media, and systems that receive a direct digital message for delivery to a recipient and then generate a relevance score representing the direct digital message's relevance to the recipient. The relevance score accounts for either or both of crowdsourced information and social-network signals. Based on the relevance score, the methods, non-transitory computer readable media, and systems either provide the direct digital message to the recipient's client device for display within a received-messages preview or provide the message to the recipient's client device for sequestration within a sequestration folder.

20 Claims, 10 Drawing Sheets

(56) References Cited

U.S. PATENT DOCUMENTS

| | | | |
|---|---|---|---|
| 2007/0156886 A1* | 7/2007 | Srivastava | H04L 51/12 709/224 |
| 2010/0306845 A1* | 12/2010 | Vaithilingam | H04L 51/12 726/23 |
| 2011/0246584 A1* | 10/2011 | Vitaldevara | G06Q 10/107 709/206 |
| 2011/0320541 A1* | 12/2011 | Bendel | G06Q 10/107 709/206 |
| 2012/0089681 A1* | 4/2012 | Chowdhury | H04L 51/26 709/206 |
| 2013/0018965 A1* | 1/2013 | Ramachandran | G06Q 10/107 709/206 |
| 2014/0019542 A1* | 1/2014 | Rao | G06Q 30/0269 709/204 |
| 2014/0136997 A1* | 5/2014 | Spivack | H04L 51/32 715/753 |
| 2015/0082448 A1* | 3/2015 | Elovici | G06Q 10/107 726/26 |
| 2015/0288634 A1* | 10/2015 | Emigh | G06Q 10/107 709/206 |
| 2015/0370909 A1* | 12/2015 | Volach | G06Q 30/0269 707/722 |
| 2016/0014151 A1* | 1/2016 | Prakash | H04L 63/1483 726/22 |
| 2016/0092771 A1* | 3/2016 | Buckley | H04L 67/02 706/52 |
| 2016/0094646 A1* | 3/2016 | Spivack | H04L 67/1042 709/204 |
| 2016/0234326 A1* | 8/2016 | Camplejohn | H04L 51/10 |
| 2016/0259790 A1* | 9/2016 | Mashiach | G06F 16/9535 |
| 2017/0142051 A1* | 5/2017 | Spivack | G06Q 10/10 |
| 2017/0177726 A1* | 6/2017 | Subramanian | G06F 16/9535 |
| 2018/0101613 A1* | 4/2018 | Bastide | G06F 40/10 |
| 2018/0131652 A1* | 5/2018 | Smith | H04L 67/306 |
| 2018/0176164 A1* | 6/2018 | Agarwal | H04L 51/14 |
| 2018/0234368 A1* | 8/2018 | Everton | G06Q 10/107 |
| 2018/0255011 A1* | 9/2018 | Mankovskii | H04L 67/22 |
| 2018/0336543 A1* | 11/2018 | Van Os | H04L 67/1078 |
| 2019/0052591 A1* | 2/2019 | Abou Mahmoud | G06F 16/337 |
| 2019/0068540 A1* | 2/2019 | Chowdhury | H04L 67/22 |
| 2019/0096113 A1* | 3/2019 | Stukalov | G06T 13/00 |
| 2019/0245825 A1* | 8/2019 | Shah | H04L 67/02 |
| 2019/0319905 A1* | 10/2019 | Baggett | H04L 51/12 |

* cited by examiner

GENERATING A RELEVANCE SCORE FOR DIRECT DIGITAL MESSAGES BASED ON CROWDSOURCED INFORMATION AND SOCIAL-NETWORK SIGNALS

BACKGROUND

The exchange of electronic messages is ever increasing. Internet users, for example, frequently exchange instant messages using messaging applications on mobile devices and desktop computers. Similarly, mobile device users frequently exchange Short Message Service ("SMS") messages—and more recently Multimedia Messaging Service ("MMS")—over a cellular data network's base stations. Some existing messaging systems are connection-dependent messaging systems. Such systems limit the senders and recipients to or from whom a user can send or receive electronic messages. In some cases, for instance, existing connection-dependent messaging systems limit users to sending or receiving electronic messages to or from other users with whom they have established a connection through a messaging or social networking system. The connection dependence may be limited to an invitation and acceptance to connect through a social networking system. This connection-dependent communication has several advantages. It controls the volume of electronic messages received by a user in a received-messages storage and limits the universe of potential senders or recipients who may exchange electronic messages with a particular user.

But the connection-dependent communication also inhibits a user from exchanging electronic messages with persons or organizations that have not connected with the user through a messaging system or social networking system. To control unsolicited messages, for example, some existing connection-dependent messaging systems sequester electronic messages into a sequestration folder when the sender of the electronic message is not connected to the recipient (e.g., the sender and recipient are not friends or otherwise connected through the social networking system). A recipient may have genuine interest in the receiving and accessing an electronic message from another entity to which the recipient is not connected. Unfortunately, connection-dependent communication systems can prevent or reduce the likelihood of the recipient accessing the electronic message.

In contrast to connection-dependent messaging systems, some existing messaging systems are connection-independent systems. Such systems do not limit the senders and recipients to or from whom a user can send or receive electronic messages. Without such limits, however, connection-independent systems can inundate a user with unsolicited electronic messages. Consequently, the received-messages storage for users in a connection-independent system can quickly exceed data limitations—requiring increasingly more data storage—and can intermix both relevant and irrelevant electronic messages.

SUMMARY

This disclosure describes one or more embodiments of methods, non-transitory computer readable media, and systems that solve the foregoing problems in addition to providing other benefits. While this summary refers to systems for simplicity, the summary also applies to certain disclosed methods and non-transitory computer readable media. To solve the foregoing and other problems, the disclosed systems receive a direct digital message for delivery to a recipient and then generate a relevance score representing the direct digital message's relevance to the recipient. The relevance score accounts for either or both of crowdsourced information and social-network signals. Based on the relevance score, the systems either provide the direct digital message to the recipient's client device for display within a received-messages preview or provide the message to the recipient's client device for sequestration within a sequestration folder.

In some embodiments, for instance, the systems receive a direct digital message from a sender's client device for delivery to a recipient through a messaging application. Upon receipt of the direct digital message, the disclosed systems identify crowdsourced information and social-network signals concerning the sender. Based on the crowdsourced information and the social-network signals, the systems generate a relevance score that represents the direct digital message's relevance to the recipient. Upon determining that the relevance score exceeds a relevance-score threshold, the disclosed systems provide the direct digital message to the recipient's client device for display within a received-messages preview.

The disclosed systems avoid the limits of both existing connection-dependent messaging systems and connection-independent messaging systems. By generating a relevance score that influences the display of direct digital messages, the disclosed systems ensure that direct digital messages that are relevant to a recipient—but that come from a sender that is not connected to the recipient—are shown within a received-messages preview. On the other hand, by generating a relevance score, the disclosed systems can sequester irrelevant and unsolicited direct digital messages.

BRIEF DESCRIPTION OF THE DRAWINGS

The detailed description refers to the drawings briefly described below.

DETAILED DESCRIPTION

Figure 1:
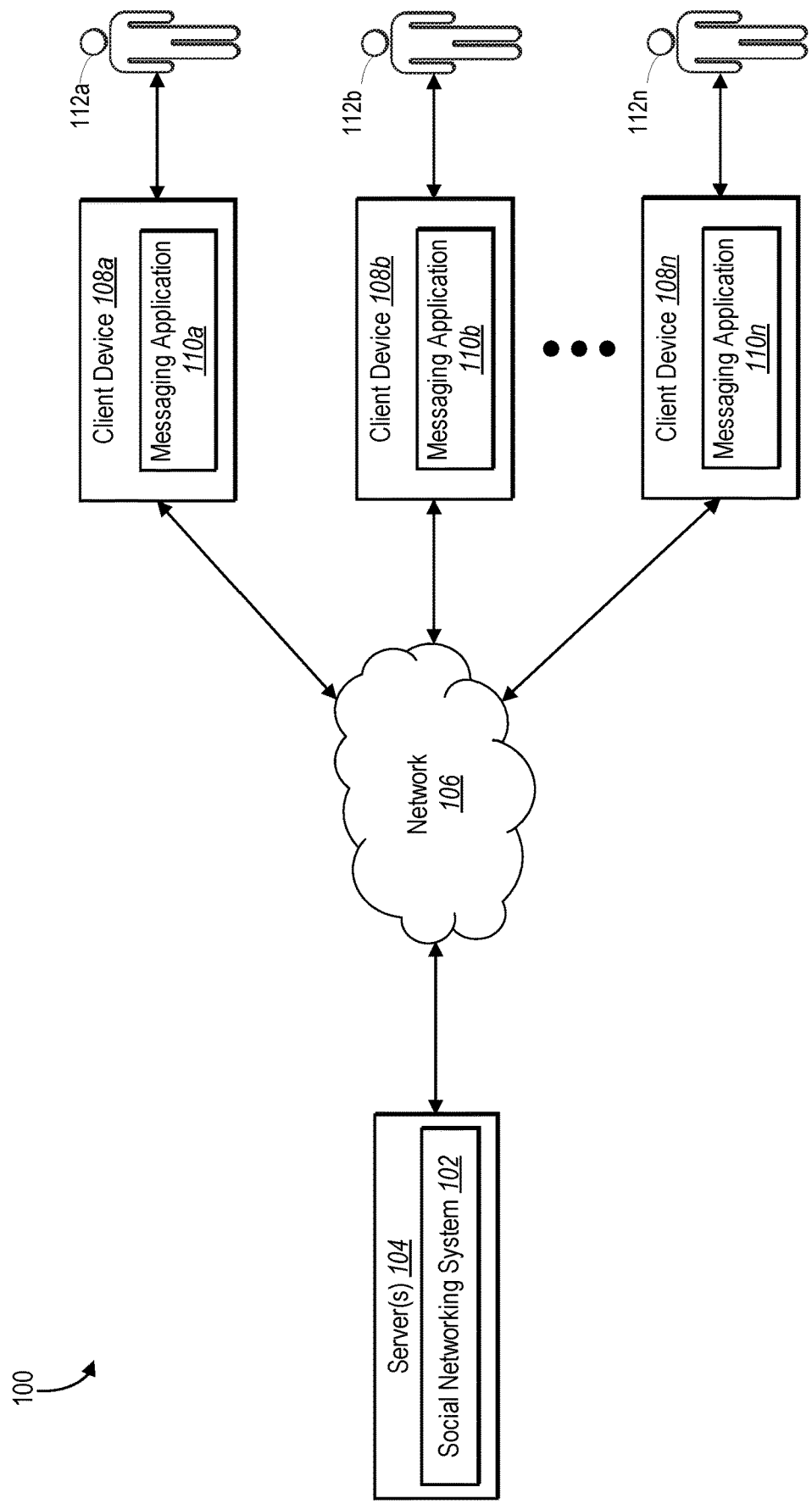
FIG. 1 illustrates a block diagram of an environment for implementing a social networking system in accordance with one or more embodiments.

This disclosure describes a social networking system that receives a direct digital message for delivery to a recipient and then generates a relevance score representing the direct digital message's relevance to the recipient. The relevance score accounts for either or both of crowdsourced information and social-network signals. Based on the relevance score, the social networking system either provides the direct digital message to the recipient's client device for display within a received-messages preview or provides the message to the recipient's client device for sequestration within a sequestration folder.

In some embodiments, for instance, the social networking system receives a direct digital message from a sender's client device for delivery to a recipient through a messaging application. Upon receipt of the direct digital message, the social networking system identifies crowdsourced information and social-network signals concerning the sender. Based on the crowdsourced information and the social-network signals, the social networking system generates a relevance score that represents the direct digital message's relevance to the recipient. Upon determining that the relevance score exceeds a relevance-score threshold, the social networking system provides the direct digital message to the recipient's client device for display within a received-messages preview.

Before generating a relevance score for a direct digital message, the social networking system optionally determines whether a sender and a recipient of the direct digital message are connected through the social networking system. In some embodiments, for example, the social networking system determines that the sender and the recipient are connected through the social networking system. Among other processes, the social networking system may identify that the sender and recipient are connected by an invitation and acceptance that connects them through the social networking system (e.g., as "friends" or "contacts"). If, on the one hand, the sender and recipient are connected, in certain embodiments, the social networking system provides the direct digital message to the recipient's client device for display within the received-messages preview. If, on the other hand, the sender and recipient are not connected, in certain embodiments, the social networking system provides the direct digital message to the recipient's client device for sequestration within a sequestration folder.

As noted above, when generating a relevance score, the social networking system optionally bases the relevance score in part on crowdsourced information. The crowdsourced information may take several forms. For example, crowdsourced information may include an indication from users of a social networking system that direct digital messages from a sender are unsolicited messages. Additionally, or alternatively, in some embodiments, crowdsourced information includes reviews of a page on the social networking system associated with the sender (e.g., a sender's profile page or timeline). The crowdsourced information also, for instance, may include data concerning other users' responses (or non-responses) to direct digital messages from a sender.

Likewise, the social networking system optionally bases the relevance score in part on social-network signals. Social-network signals come in a variety of forms. For example, social-network signals may include activities that the sender or recipient performed within the social networking system, such as activities comprising the sender and recipient's communication history. That communication history may include, for example, prior exchanges of direct digital messages, comments on each other's posts, reactions to each other's posts or comments, or posting of images on each other's timelines or pages. The communication history can comprise a frequency of exchange of messages, a duration of messages exchanged, a time of, or since, a last message, etc. Additionally, or alternatively, social-network signals may include an affinity coefficient for a recipient of a direct digital message relative to the sender based on a social graph of the social networking system. In some embodiments, social-network signals include information entered within a profile or account of the social networking system by a user.

In addition to using crowdsourced information and social-network signals to generate relevance scores, the social networking system optionally updates either one or both of the crowdsourced information and the social-network signals. For example, the social networking system may detect new crowdsourced information (e.g., an indication that a direct digital message is unsolicited) and/or determine new social-network signals (e.g., generating an updated affinity coefficient or determining an updated communication history) that alters the relevance score. In some embodiments, upon updating the relevance score, the social networking system performs a corrective action concerning a direct digital message. For instance, the social networking system may send a notice to the recipient's client device to remove the direct digital message from the received-messages preview and to add the direct digital message to a sequestration folder.

The social networking system avoids the limits of existing connection-dependent messaging systems. As noted above, some existing connection-dependent messaging systems sequester a direct digital message into a sequestration folder when the sender of the direct digital message is not connected to the recipient—regardless of the direct digital message's relevance to the recipient. By generating a relevance score that influences the display of direct digital messages within the recipient's client device, the social networking system ensures direct digital messages that are relevant to the recipient—but that come from a sender that is not connected to the recipient—are shown within a received-messages preview.

The social networking system also avoids the limits of connection-independent messaging systems. Recall that some connection-independent messaging systems create data-overload problems that expose users to many direct digital messages—an excess number of which obscures relevant messages and exceeds data-storage limitations. Such connection-independent independent messaging systems lack a mechanism for identifying relevant and irrelevant direct digital messages for a recipient. By generating a relevance score that also influences the sequestration of direct digital messages, the disclosed social networking system sequesters irrelevant and unsolicited direct digital messages to a sequestration folder.

Turning now to the figures, FIG. 1 illustrates a block diagram of one embodiment of a system environment 100 in which a social networking system 102 operates. As illustrated in FIG. 1, the system environment 100 includes a social networking system 102, implemented by one or more server(s) 104. The system environment 100 further includes client devices 108a-108n. As depicted in FIG. 1, each of the client devices 108a-108n have an associated user—with a user 112a associated with the client device 108a, a user 112b associated with the client device 108b, and a user 112n associated with the client device 108n. The users 112a-112n may be persons, organizations, or other entities. Although FIG. 1 illustrates a particular number of client devices 108a-108n and a particular number of associated users 112a-112n, the system environment 100 may include any number of client devices and any number of associated users.

In some embodiments, the social networking system 102 receives and sends direct digital messages to and from the client devices 108a-108n. As used in this disclosure, the term "direct digital message" refers to a digital message that is sent directly (or pushed) to a recipient's account or client device. For example, a direct digital message includes pushed Internet-based electronic messages, a Multimedia Messaging Service ("MMS") message, or Short Message Service ("SMS") message. A direct digital message is not and does not include electronic mail or email. To illustrate the idea of a direct digital message, in some embodiments, the data packets that constitute a direct digital message are pushed to the recipient's client device without a corresponding request (or pull) from the recipient's client device. Additionally, in certain embodiments, a direct digital message is not only directly sent (or pushed) to a recipient's client device, but it is simultaneously sent to a server for addition to a messaging thread, such as a messaging thread for Facebook Messenger.

The term "messaging thread" refers to a collection of one or more direct digital messages exchanged between (or among) users of a messaging system or a social networking system. Accordingly, a messaging thread may include multiple direct digital messages sent exclusively between users. But a messaging thread may likewise include a single direct digital message sent exclusively from one user to another user. In some embodiments, a messaging thread is a "group messaging thread" comprising a collection of direct digital messages exchanged among a group of three or more users of a messaging system or a social networking system.

The social networking system 102 not only receives direct digital messages from one or more of the client device 108a-108n, but optionally receives direct digital messages from a third-party messaging system (not shown). In such embodiments, the social networking system 102 sends or relays direct digital messages to one or more of the client devices 108a-108n. Such a third-party messaging system may comprise a cellular data network with base stations and cell towers. The base stations and cell towers relay MMS messages and SMS messages. Additionally, or alternatively, in some embodiments, the third-party messaging system comprises severs, MMS gateways, and/or SMS gateways to facilitate sending MMS and/or SMS messages to computing devices.

When sending and receiving direct digital messages or other digital content, the client devices 108a-108n communicate over a network 106 with the social networking system 102, including the server(s) 104. This disclosure describes additional details related to the social networking system 102 below with reference to FIGS. 7-8. The network 106 may represent a network or a collection of networks, such as the Internet, a corporate intranet, a local area network ("LAN"), or a combination of two or more such networks. The network 106 may also be any suitable network over which the client devices 108a-108n (or other components) access the social networking system 102 (or vice versa).

As further shown in FIG. 1, the server(s) 104 can enable the various functions, features, processes, methods, and systems described in this disclosure using, for example, instructions within the social networking system 102. Additionally, or alternatively, the server(s) 104 coordinate with the client devices 108a-108n to perform or provide the various functions, features, processes, methods, and systems described in more detail below. Although FIG. 1 illustrates a particular arrangement of the social networking system 102, server(s) 104, network 106, and client devices 108a-108n, various additional arrangements are possible. For example, the social networking system 102 and the server(s) 104 may directly communicate with the client devices 108a-108n and thus bypass the network 106.

Generally, the client devices 108a-108n can be any one of various types of client devices. For example, the client devices 108a-108n can be a mobile device (e.g., a smart phone), tablet, laptop computer, desktop computer, television, or any other type of computing device as further explained below with reference to FIG. 6. Similarly, the server(s) 104 can include one or more computing devices, including those explained below with reference to FIG. 6. Moreover, the server(s) 104, social networking system 102, network 106, and client devices 108a-108n may communicate using any communication applications and technologies suitable for transporting data and/or communication signals, including any known communication technologies, devices, media, and protocols supportive of data communications.

As an overview of the system environment 100, the server(s) 104 provide the client devices 108a-108n access to the social networking system 102 through the network 106. When the social networking system 102 receives a direct digital message from the client device 108a, for example, the social networking system 102 identifies that the direct digital message is addressed to a recipient (e.g., user 112b). The social networking system 102 determines an account associated with the recipient and sends the direct digital message to a messaging application 110b of the social networking system 102 on a client device 108b with which the account associated with the recipient is logged into the social networking system 102.

As shown in FIG. 1, the client devices 108a-108n each include a messaging application—with a messaging application 110a installed on the client device 108a, a messaging application 110b installed on the client device 108b, and a messaging application 110n installed on the client device 108n. In some embodiments, the client devices 108a-108n communicate with the server(s) 104 of the social networking system 102 via dedicated applications on the client devices 108a-108n—that is, the messaging applications 110a-110n.

Among other things, the messaging applications 110a-110n facilitate the presentation and exchange of direct digital messages. For example, in certain embodiments, the messaging applications 110a-110n respectively cause the client devices 108a-108n to send or receive direct digital messages either through the social networking system 102 (e.g., for instant messages) or through a third-party messaging system (e.g., for MMS or SMS messages). In certain embodiments, the messaging applications 110a-110n include instructions that, when executed by the client devices 108a-108n, respectively cause the client devices 108a-108n to present a direct digital message within a received-messages preview or to sequester the direct digital message within a sequestration folder.

Figure 4B:
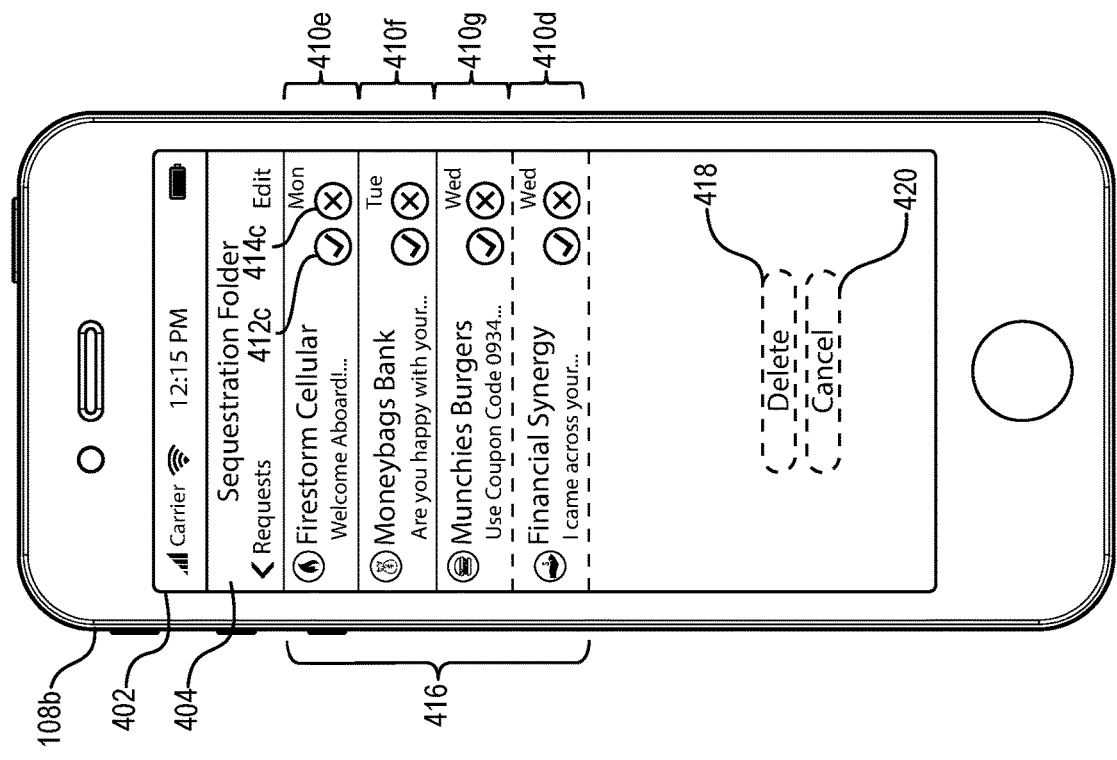
FIGS. 4A-4B illustrate user interfaces of a client device presenting direct digital messages within a received-messages preview and a sequestration folder in accordance with one or more embodiments.
Figure 4A:
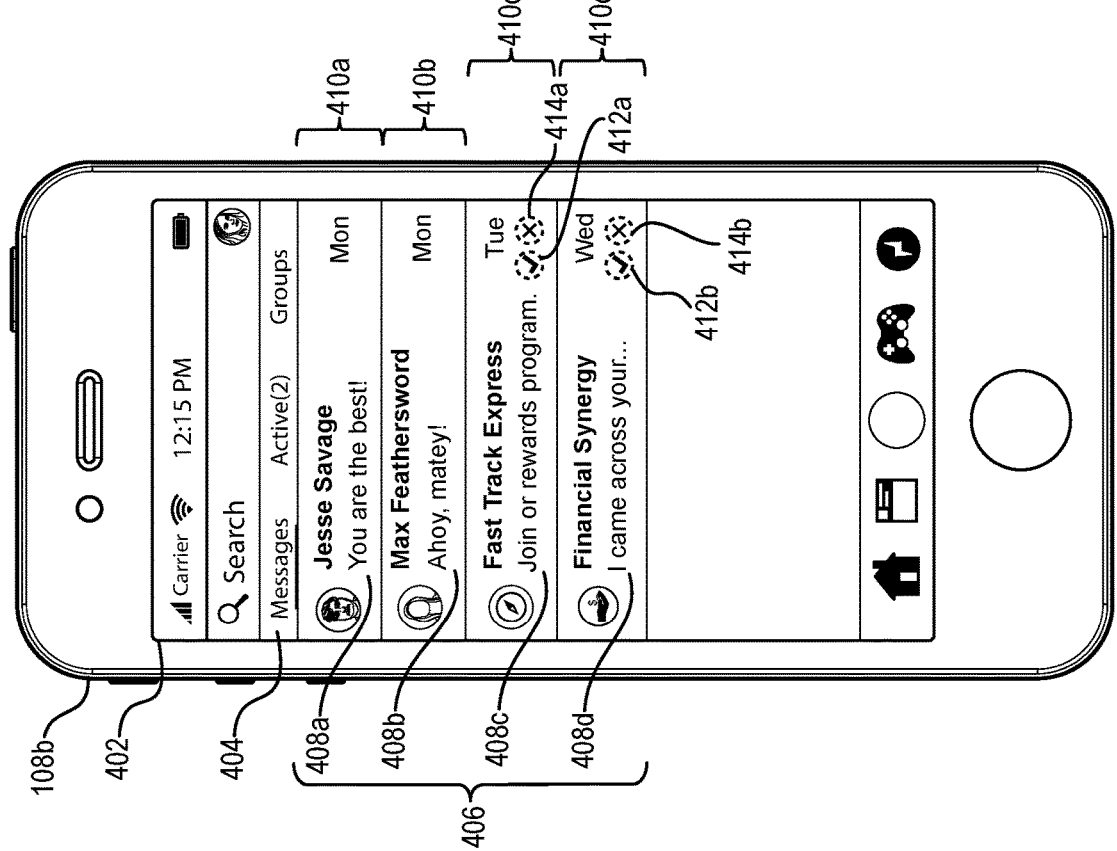

As used in this disclosure, the term "received-messages preview" refers to a graphical display of received direct digital messages. In some embodiments, a received-messages preview includes a display of preview messages corresponding to direct digital messages. The term "preview message" refers to a sample or snippet of a direct digital message that a client device presents as part of a push notification or received-messages preview for a received-messages storage. FIG. 4A depicts an example of a received-messages preview and preview messages.

Relatedly, the term "received-messages storage" refers to a storage of direct digital messages that either a social networking system or client device maintains. By contrast, the term "sequestration folder" refers to a data storage for unsolicited direct digital messages and/or direct digital messages assigned a relevance score below a relevance-score threshold. In some embodiments, a social networking system or client device removes direct digital messages from a sequestration folder after a predetermined time.

Although FIG. 1 depicts the messaging applications 110a-110n as separate and standalone applications, in an alternative embodiment, the messaging applications 110a-110n are part of social networking applications (or vice versa). Regardless of whether the messaging applications 110a-110n are separate or part of social networking applications, in some embodiments, the messaging applications 110a-110n comprise web browsers, applets, or other software applications (e.g., native applications) available to the client devices 108a-108n. Additionally, in some instances, the social networking system 102 provides data packets including instructions that, when executed by the client devices 108a-108n, create or otherwise integrate messaging applications 110a-110n within an application or webpage. The social networking system 102 not only provides data packets that support the messaging applications 110a-110n, but also communicate with and exchange data packets with their associated client devices 108a-108n in response to data packets sent by the client devices 108a-108n—per instructions within the messaging applications 110a-110n.

To facilitate user interaction with the social networking system 102, the messaging applications 110a-110n each optionally provide one or more graphical user interfaces associated with the social networking system 102; receive indications of interactions of the users 112a-112n with the graphical user interfaces; and perform various requests, queries, or responses to other user input, such as presenting preview messages of direct digital messages within a received-messages preview or presenting a messaging thread within the messaging applications 110a-110n.

Upon receiving a direct digital message from the client device 108a for delivery to a recipient, for example, the social networking system 102 optionally determines that the sender and the recipient are not connected through the social networking system 102. For instance, the social networking system 102 may determine that the sender and recipient are not connected by an invitation and acceptance that would connect the two users through the social networking system 102 (e.g., as "friends" or "contacts"). Regardless of whether the social networking system 102 determines the sender and recipient are (or are not) connected, the social networking system 102 identifies crowdsourced information and/or social-network signals concerning the sender after receiving the direct digital message.

As used in this disclosure, the term "crowdsourced information" refers to information that a social networking system collects from its users' activity or from data related to either or both a sender and recipient of a direct digital message. By contrast, the term "social-network signals" refers to data collected from within a social networking system related to either or both a sender and recipient of a direct digital message. This disclosure provides examples of crowdsourced information and social-network signals both above and below.

Based on the identified crowdsourced information and social-network signals, the social networking system 102 optionally generates a relevance score representing a relevance of the direct digital message to the recipient. As explained below, the social networking system 102 optionally generates a relevance score that represents a product, inverse product, sum, or inverse sum of a crowdsourced-information factor and a social-network-signal factor concerning the sender. As used in this disclosure, the term "relevance score" refers to a score that represents a relevance of a direct digital message to a recipient. The social networking system 102 may generate a relevance score based on either or both of crowdsourced information and social-network signals.

If the relevance score exceeds a relevance-score threshold, the social networking system 102 sends the direct digital message to the recipient's client device (e.g., client device 108b) for display within a received-messages preview. If the relevance score falls below the relevance-score threshold, the social networking system 102 sends the direct digital message to the recipient's client device (e.g., client device 108b) for sequestration within a sequestration folder.

Figure 2A:
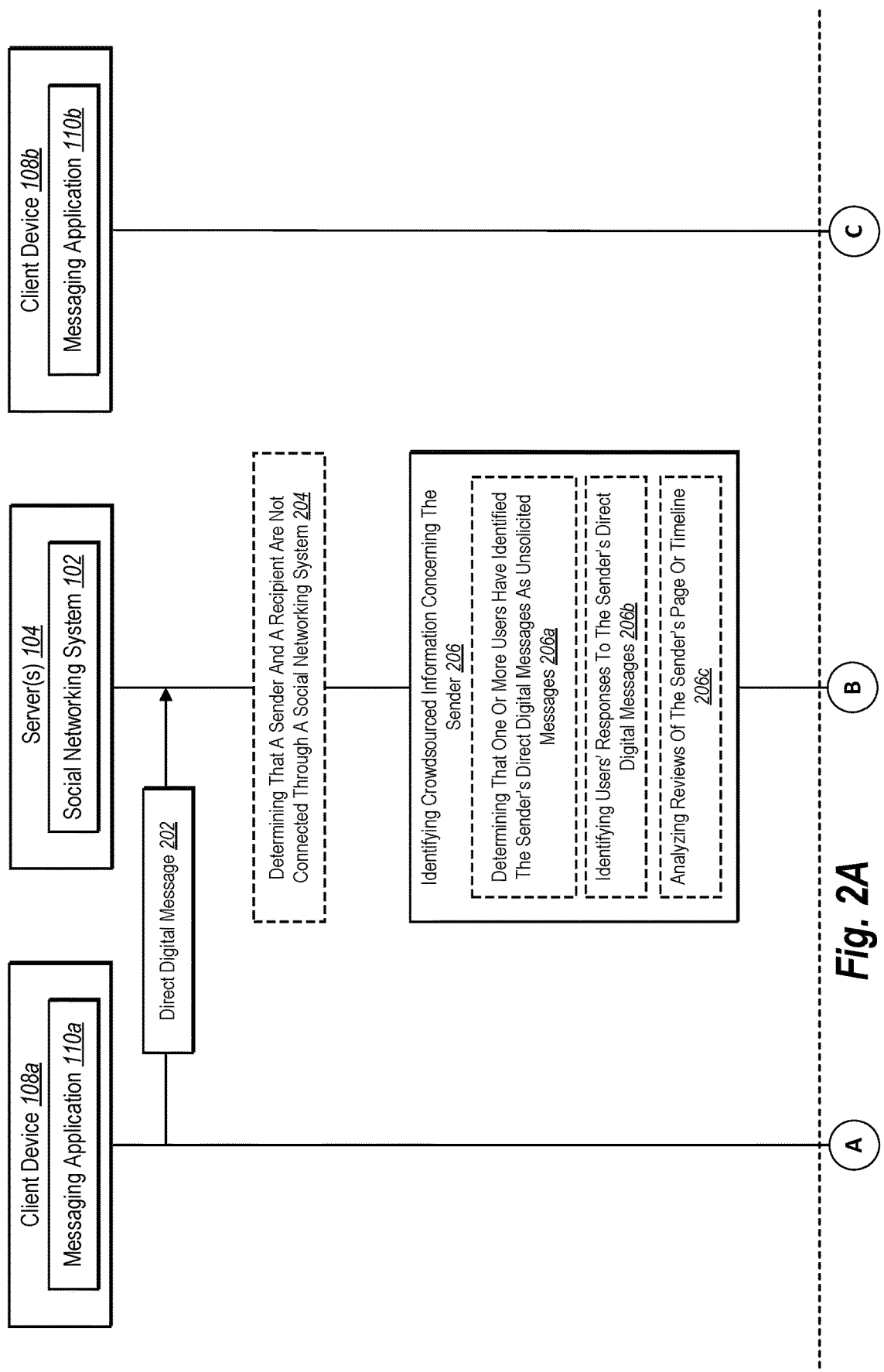
FIGS. 2A-2C illustrate a sequence-flow diagram of generating a relevance score representing a direct digital message's relevance to a recipient based on crowdsourced information and social-network signals in accordance with one or more embodiments.
Figure 2B:
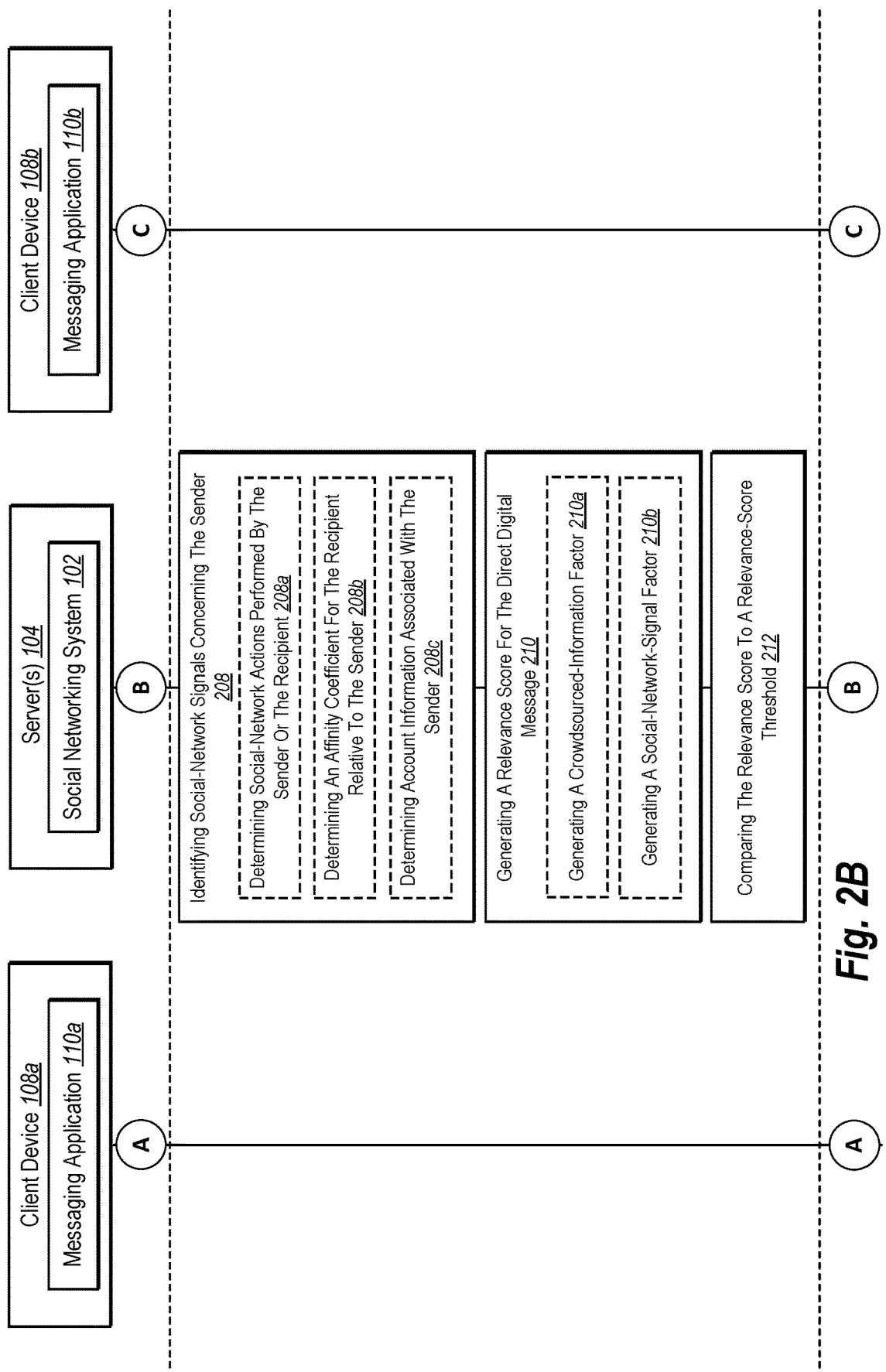
Figure 2C:
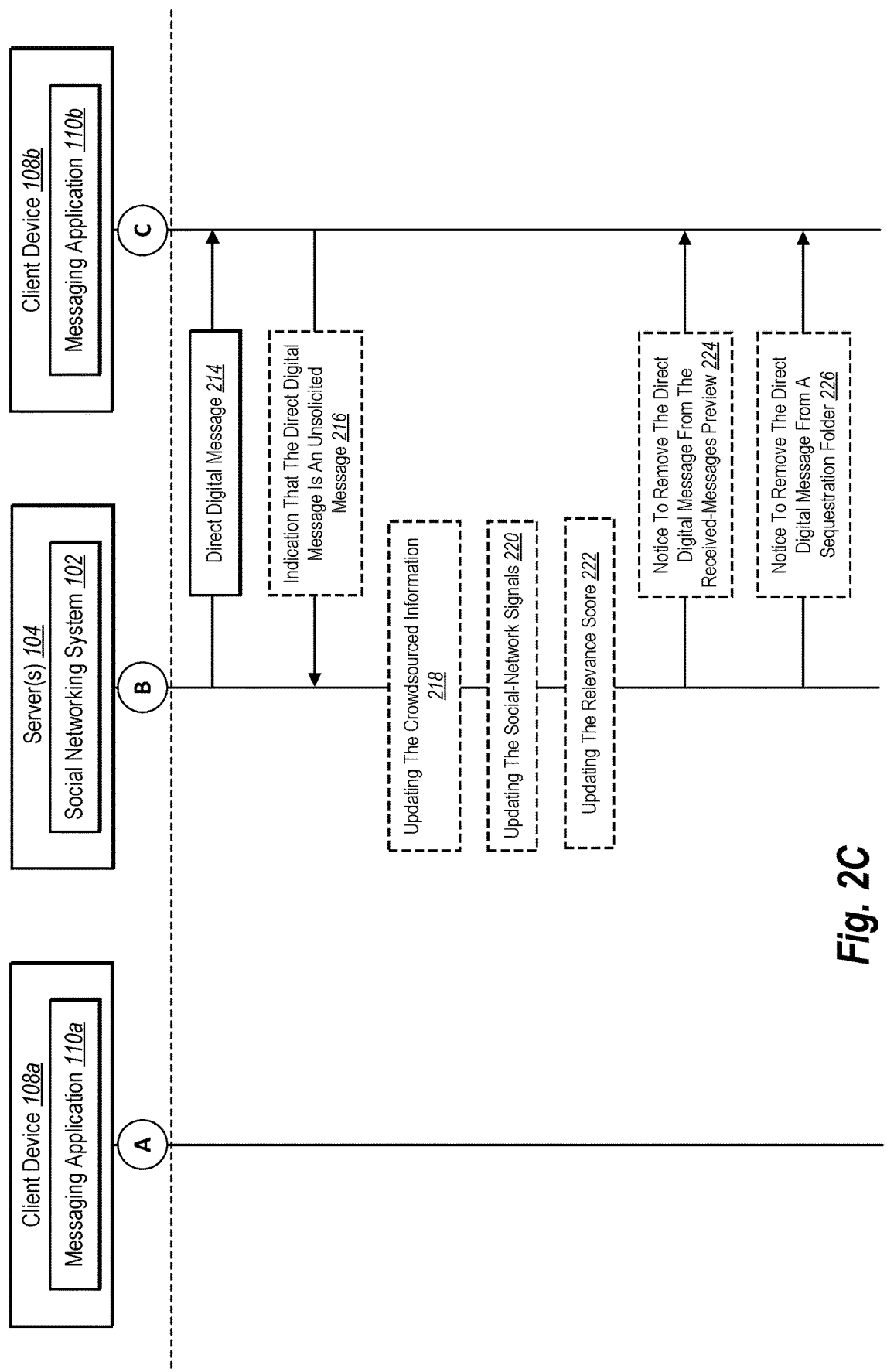

Turning now to FIGS. 2A-2C, these figures provide an overview of embodiments of the social networking system 102 that generate a relevance score representing a direct digital message's relevance to a recipient and—based on that score—provide the direct digital message to the recipient's device for display within a received-messages preview. Specifically, FIGS. 2A-2C illustrate a representation of a sequence of acts 202-226 that the social networking system 102, the client device 108a, or the client device 108b perform, such as receiving a direct digital message, identifying crowdsourced information and social-network signals, generating a relevance score for the direct digital message, and providing the direct digital message to the recipient's client device.

Various components of the system environment 100 perform the acts 202-226 shown in FIGS. 2A-2C. In some embodiments, for example, the social networking system 102 comprises computer-executable instructions that cause the server(s) 104 to perform one or more of the acts 202-226. Similarly, in certain embodiments, the messaging applications 110a and 110b comprise computer-executable instructions that respectively cause the client device 108a and the client device 108b to perform one or more of the acts 202-226. Rather than repeatedly describe the instructions within the social networking system 102 as causing the server(s) 104 to perform certain acts—or the instructions within the messaging applications 110a and 110b as causing the client device 108a and client device 108b to perform certain acts—this disclosure primarily describes the social networking system 102, the client device 108a, or the client device 108b as performing the acts 202-226 as a shorthand for those relationships.

Turning now to those acts, as shown in FIG. 2A, the client device 108a performs the act 202 of sending a direct digital message to the social networking system 102. The social networking system 102 in turn receives the direct digital message. In some embodiments, the client device 108a sends to the social networking system 102 data packets that encode the direct digital message and identify a recipient of the direct digital message. The client device 108a alternatively sends data packets separate from the direct digital message that identify the recipient. In the embodiment shown in FIG. 2A, the client device 108a sends data packets that encode a direct digital message, identify the user 112b as the recipient, and indicate that the direct digital message be delivered through a messaging application.

Upon receiving the direct digital message, the social networking system 102 optionally performs the act 204 of determining that a sender and recipient are not connected through the social networking system 102. For example, the social networking system 102 may determine that the sender and recipient are (or are not) connected by an invitation and acceptance that would connect the two users through the social networking system 102. This invitation and acceptance may include an invitation and acceptance to be contacts, family, followers, friends, group members, or any other relationship formed by invitation and acceptance within the social networking system 102.

Alternatively, in some embodiments, the social networking system 102 may determine that the sender and recipient are (or are not) connected by a selection by the sender or recipient that would connect the two users through the social networking system 102. In contrast to the invitation-and-acceptance identification, a sender and recipient may be connected without a corresponding acceptance when the sender or recipient selects to befriend, connect, or follow the recipient or sender, respectively; joins a group of which the recipient or sender is a member; or forms any other connected relationship established by selection through the social networking system 102. In certain embodiments, however, the social networking system 102 determines whether the sender and recipient are (or are not) connected by a relationship that includes rights to exchange direct digital messages (e.g., a friend or messaging-contact relationship).

When performing the act 204, the social networking system 102 optionally determines that the sender and recipient are (or are not) connected through more than one connection through the social networking system 102. For example, in the embodiment shown in FIG. 2A, the social networking system 102 determines that the user 112a and the user 112b are not connected by an invitation and acceptance to connect through a messaging application of the social networking system 102. The social networking system 102 also determines that the user 112a and the user 112b are not connected by an invitation and acceptance to connect as friends through the social networking system 102. In other words, the social networking system 102 determines that neither the user 112a nor the user 112b have sent an invitation to connect through a messaging application of the social networking system 102 or to connect as friends and then also received an acceptance of either invitation.

Regardless of whether the social networking system 102 determines the sender and recipient are connected, as further shown in FIG. 2A, the social networking system 102 performs acts to determine whether the direct digital message is relevant to the recipient. In particular, the social networking system 102 performs the act 206 of identifying crowdsourced information concerning the sender. When identifying crowdsourced information, in certain embodiments, the social networking system 102 identifies information in a variety of forms, including users' reactions to a direct digital message from the sender and users' activity with respect to objects within the social networking system 102 related to the sender.

As shown in FIG. 2A, for example, the social networking system 102 optionally performs the act 206a of determining that one or more users of the social networking system 102 have identified the sender's direct digital messages as unsolicited messages. To obtain this type of crowdsourced information, the social networking system 102 optionally provides an unsolicited-tag option for direct digital messages as part of a messaging application. When a recipient selects the unsolicited-tag option in connection with a direct digital message from the sender, the social networking system 102 receives an indication that the direct digital message has been identified as an unsolicited message. In some embodiments, when identifying crowdsourced information, the social networking system 102 determines a number or percentage of direct digital messages from a sender that other users of the social networking system 102 have identified as unsolicited messages.

In addition to identifying unsolicited-message tags for a sender's direct digital messages, the social networking system 102 optionally performs the act 206b of identifying users' responses to the sender's direct digital messages. When doing so, the social networking system 102 identifies whether users of the social networking system 102 respond (or do not respond) to direct digital messages from the sender. For example, the social networking system 102 may identify a number or percentage of messaging threads that include a direct digital message from the sender and that further include a response to the sender's direct digital message. In some such embodiments, the social networking system 102 identifies a number or percentage of direct digital messages from the sender within a predetermined time period that elicit a response (e.g., a percentage of the sender's direct digital messages within one year, six months, or three months that elicit a response from recipients).

Based on the number or percentage of responses to a sender's direct digital messages, in certain embodiments, the social networking system 102 determines a probability that a user of the social networking system 102 responds to direct digital messages from the sender. For example, the social networking system 102 may determine a percentage of a sender's direct digital messages (within a predetermined time) that elicited a response as the probability that a user responds to direct digital messages from the sender.

In addition or in the alternative to tracking response rates to a sender's direct digital messages, and as shown in FIG. 2A, the social networking system 102 optionally performs the act 206c of analyzing reviews of the sender's page or timeline. In particular, the social networking system 102 analyzes reviews of a page or timeline of the social networking system 102 associated with the sender. For example, the social networking system 102 may apply Natural Language Processing ("NLP") techniques that identify certain keywords from comments or reviews posted on a page or timeline of the sender. Such keywords may include, but are not limited to, "bait and switch," "fraud," "junk," "liar," "lie," "fishing," "phishing," "scam," or "unsolicited."

When analyzing reviews, the social networking system 102 can identify ratings for a page or timeline of a sender. The social networking system 102 may, for example, identify a numerical, percentage, or star-based rating associated with a page or a timeline of the sender within the social networking system 102. For example, the social networking system 102 optionally enables users to provide a star-based rating from one to five stars for a page associated with the sender.

Consistent with the disclosure above, in one particular embodiment, the social networking system 102 identifies three types of crowdsourced information by performing the acts 206a, 206b, and 206c. Specifically, the social networking system 102 identifies that 7 users have tagged direct digital messages from the user 112a as unsolicited messages, that users respond to 78% of direct digital messages from the user 112a, and that a page associated with the user 112a includes 2 comments that include keywords of "liar" or "scam."

Turning now to FIG. 2B, in addition or in the alternative to identifying crowdsourced information concerning the sender, the social networking system 102 performs the act 208 of identifying social-network signals concerning the sender. While this disclosure describes the social networking system 102 as identifying (and later using) both crowdsourced information and social-network signals concerning the sender, in some embodiments, the social networking system 102 identifies (and later uses) only one of the crowdsourced information or social-network signals concerning the sender. When identifying social-network signals, the social networking system 102 optionally identifies signals in a variety of forms, including signals concerning relationships between the sender and recipient of a direct digital message and information concerning a sender's account and activities within the social networking system 102.

For example, the social networking system 102 optionally performs the act 208a of determining social-network actions performed by the sender or the recipient. In particular, the social networking system 102 tracks actions performed by the user 112a (or attributed to an account of the user 112a) and/or by the user 112b (or attributed to an account of the user 112b). Such actions may comprise the communicatory history between the sender (e.g., the user 112a) and the recipient (e.g., the user 112b), including, but not limited to, prior exchange of direct digital messages, comments on each other's posts, reactions to each other's posts or comments, or posting of images on each other's timelines or pages. Additionally, such actions include, for example, prior direct digital messages, posts, comments, or reactions on a timeline or page of the sender or another user; information entered within profile information associated with an account of the sender; or signing in to an account. The social networking system 102 may track such actions in a variety of formats. In some embodiments, the social networking system 102 analyzes edges within a social graph that represent actions attributed to an account of the sender. Alternatively, in certain embodiments, the social networking system 102 analyzes a log of activity associated with an account of the sender. Additionally, or alternatively, the social networking system 102 analyzes images posted on a page or timeline for an account of the sender to detect details concerning the posted images.

Regardless of the source of data tracking the actions performed by the sender, the social networking system 102 optionally determines a number, regularity, or time of one or more actions. For example, the social networking system 102 determines one or more of a number of direct digital messages exchanged between the sender and recipient; a number of comments the sender or recipient has made in response to each other's posts or comments; a number of images including one or more persons posted on a timeline or page for an account of the sender; a number of pages or users of the social networking system 102 followed or liked by the sender; a number of comments posted by the sender on timelines or pages of the social networking system 102; a number of reactions to posts or comments attributed to the sender, such as an angry, laughing, like, love, wow, or sad emoji reaction to a post or comment; a number of profile fields including information within profile information associated with an account of the sender, such as a birthdate, job title, educational institution, email address, telephone number, website, or other biographical information; a number of birthday comments posted on a timeline or page associated with the account of the sender; a regularity of signing in to the account, such as a mean or median amount of time in between sign ins of the account of the sender; or a time since the account was created for the sender.

In addition (or in the alternative) to determining the sender's or recipient's social-network actions, the social networking system 102 optionally performs the act 208b of determining an affinity coefficient for the recipient relative to the sender. The social networking system 102 determines the affinity coefficient based on a social graph. In some embodiments, the affinity coefficient represents a strength of a relationship between a sender and a recipient of a direct digital message. The affinity coefficient may also represent a probability or function that measures a predicted probability that a sender or recipient will perform a particular action based on the user's interest in the action, such as the predicted probability that the recipient responds to the sender's direct digital message.

In some embodiments, the social networking system 102 generates or utilizes an affinity coefficient by quantifying an affinity between the sender and recipient of a direct digital message—both of which are represented as objects within a social graph. Specifically, within the social graph, the social networking system 102 represents each of the users 112a and 112b as a node—that is, the sender and recipient in the embodiment depicted in FIGS. 2A-2C. The social networking system 102 likewise represents various other users and objects associated with the users 112a and 112b as nodes within the social graph and connections among the user nodes and object nodes as edges within the social graph. By using these nodes and edges, the social networking system 102 generates an affinity coefficient for the recipient relative to the sender. This disclosure describes affinity coefficients in more detail with reference to FIGS. 3 and 8 below.

In addition or in the alternative to determining an affinity coefficient as a social-network signal, the social networking system 102 optionally performs the act 208c of determining account information associated with the sender. For example, in certain embodiments, the social networking system 102 determines whether a profile associated with an account of the sender includes an image of a person. To make that determination, the social networking system 102 applies object detection algorithms to identify objects within a profile image associated with an account of the sender. In some such embodiments, the social networking system 102 applies some of Facebook's object-detection techniques, including, but not limited to, DeepFace, DeepMask, SharpMask, or MultiPathNet, to detect whether a profile image includes an image of a person. Additionally or alternatively, the social networking system 102 applies a Face++ algorithm, Fisherface algorithm, a GaussianFace algorithm, or some other suitable facial recognition algorithm to detect whether a profile image for an account associated with the sender includes an image of a person.

As another example of determining account information, in certain embodiments, the social networking system 102 determines whether the profile associated with the account of the sender includes an appropriated image or a stock image. As used in this disclosure, the term "appropriated image" refers to an image copied or taken from another user's profile or timeline within a social networking system. By contrast, the term "stock image" refers to an image available for public use or purchase on the Internet or other network. When determining whether a profile associated with an account of a sender includes an appropriated image or a stock image, the social networking system 102 applies an image-comparison algorithm to a profile image from the sender's account and to images either within the social networking system 102 or within an image library or database available over the network 106 (e.g., a stock-image database or stock-image library).

In some such embodiments, the social networking system 102 applies Facebook's AI Similarity Search ("FAISS") to a profile image and to images within the social networking system 102 or within an image library or database. Additionally, or alternatively, the social networking system 102 applies Scale-Invariant Feature Transform ("SIFT"), Speeded Up Robust Features ("SURF"), or any other suitable image-comparison algorithm to a profile image and images within the social networking system 102 or within an image library or database. Regardless of the technique applied, the social networking system 102 applies an image-comparison algorithm to determine whether a profile image from the sender's account matches (or is similar to) an image from within the social networking system 102 or within an image library or database to a threshold degree of certainty.

In addition or in the alternative to analyzing images associated with a sender's profile to determine account information, in certain embodiments, the social networking system 102 determines whether an account of the sender is connected to contacts that are connected to each other. To make such a determination, in some embodiments, the social networking system 102 analyzes a first user node representing the sender and other user nodes representing other users, with the other user nodes connected by edges to the first user node. Some of the edges connecting the first user node to the other user nodes represent relationships, such as a contact, family, friend, follower, or group-member relationship. The social networking system 102 follows the edge connecting the first user node to the other user nodes. The social networking system 102 then follows the edges connected to the other user nodes to determine whether any of those edges connect to a common user node (i.e., a user node connected to both the first user node and the other user node) and represent a contact, family, friend, follower, or group-member relationship.

In addition to identifying whether a sender's contacts are connected to each other, when performing the act 208c, the social networking system 102 optionally determines whether a timeline or page for an account of a sender includes images of one or more persons. In some such embodiments, the social networking system 102 applies an object detection algorithm (such as those described above) to images posted on a timeline or page for the sender's account.

Consistent with the disclosure above, in one particular embodiment, the social networking system 102 identifies three types of social-network signals by performing the acts 208a, 208b, and 208c. Specifically, in one embodiment, the social networking system 102 further determines the following social-network actions performed by the user 112a: 3 direct digital messages exchanged between the user 112a and the user 112b; 7 comments that the user 112a or the user 112b have made in response to each other's posts or comments, 74 images including at least one person posted on a timeline for an account of the user 112a, 15 pages followed by the user 112a, 453 comments posted by the user 112a on timelines or pages, 814 reactions to posts or comments attributed to the user 112a; 6 profile fields include information within profile information for the user 112a, 174 birthday comments posted on a timeline associated with the account of the user 112a, a regularity of signing in to the account of 2.5 times a day; and 134 months since the account was created for the user 112a. Additionally, the social networking system 102 determines an affinity coefficient for the user 112b relative to the user 112a. The social networking system 102 also determines the following account information associated with the user 112a: a profile associated with an account of the user 112a includes an image of a person that is neither an appropriated image or a stock image, the account of the user 112a is connected to 4 other users who are mutual friends with the user 112b.

As further shown in FIG. 2B, upon identifying either or both of the crowdsourced information and social-network signals concerning the sender, the social networking system 102 performs the act 210 of generating a relevance score for the direct digital message. To generate the relevance score representing a relevance of the direct digital message from the sender (e.g., user 112a) to the recipient (e.g., 112b), the social networking system 102 measures or quantifies the crowdsourced information and social-network signals. While each measure or quantification of crowdsourced information and social-network signals may by itself be a relevance score, in some embodiments, the social networking system 102 generates the relevance score as a product, inverse product, sum, or inverse sum of a crowdsourced-information factor and a social-network-signal factor. This disclosure describes each factor in turn.

As part of generating the relevance score, the social networking system 102 optionally performs the act 210a of generating a crowdsourced-information factor. As noted above, the social networking system 102 identifies various crowdsourced information concerning the sender. The social networking system 102 measures or quantifies this crowdsourced information to create a crowdsourced-information factor. For example, in some embodiments, the social networking system 102 identifies and then quantifies three types of crowdsourced information described above with reference to the acts 206a, 206b, and 206c—the sender's direct digital messages identified as unsolicited messages, a probability that a user of the social networking system 102 responds to the sender's direct digital messages, and reviews of a page on the social networking system 102 associated with the sender.

As suggested above, in alternative embodiments, the social networking system 102 may identify and then quantify one, two, or three types of crowdsourced information described above corresponding to any one of the acts 206a, 206b, and 206c to generate a crowdsourced-information factor. Indeed, in some embodiments, a single factor assigned to one type of crowdsourced information may constitute the crowdsourced-information. Moreover, in additional embodiments, multiple factors assigned to different types of crowdsourced information collected within one of the acts 206a, 206b, and 206c may constitute the crowdsourced-information factor.

As further shown in FIG. 2B and as part of generating the relevance score, the social networking system 102 optionally performs the act 210b of generating a social-network-signal factor. As noted above, the social networking system 102 may identify various social-network signals concerning the sender. The social networking system 102 measures or quantifies these social-network signals to create a social-network-signal factor. For example, in some embodiments, the social networking system 102 identifies and then quantifies three types of social-network signals described above with reference to the acts 208a, 208b, and 208c—social-network actions performed by the sender or the recipient, an affinity coefficient for a recipient relative to a sender, and account information associated with the sender.

As suggested above, in alternative embodiments, the social networking system 102 may identify and then quantify one, two, or three types of social-network signals described above corresponding to any one of the acts 208a, 208b, and 208c to generate a social-network-signal factor.

Indeed, in some embodiments, a single factor assigned to one type of social-network signal may constitute the social-network-signal factor. Moreover, in additional embodiments, multiple factors assigned to different types of social network signals collected within one of the acts 208a, 208b, and 208c may constitute the social-network-signal factor.

As noted above, the social networking system 102 optionally generates a relevance score for a direct digital message by determining a product, inverse product, sum, or inverse sum of a crowdsourced-information factor and a social-network-signal factor. Alternatively, in some embodiments, the social networking system 102 may use a different combination of a crowdsourced-information factor and a social-network-signal factor to generate a relevance score for a direct digital message.

Additionally, the social networking system 102 may apply different or equal weights to a crowdsourced-information factor and a social-network-signal factor when generating a relevance score for a direct digital message. For example, the social networking system 102 may apply a heavier weight to a crowdsourced-information factor or a percentage weight to a social-network-signal weight when the social networking system 102 determines that the account of the sender belongs to an organization (e.g., business, marketing firm, insurance company, recruiting firm). As another example, the social networking system 102 may apply a heavier weight to a social-network-signal factor or a percentage weight to a crowdsourced-information factor weight when the social networking system 102 determines that the account of the sender belongs to a person. Such heavier weights may come in the form of a weight great than 1 (e.g., 1.25, 5.0), and such percentage weights may come in the form of a weight less than 1 (e.g., 0.50, 0.75).

As further shown in FIG. 2B, having determined a relevance score, the social networking system 102 performs the act 212 of comparing the relevance score to a relevance-score threshold. To make the comparison, in some embodiments, the social networking system 102 employs machine learning models to identify a relevance-score threshold that predicts whether users of the social networking system 102 will identify a direct digital message from the sender as an unsolicited message or, alternatively, not respond to the direct digital message. For example, in some embodiments, the social networking system 102 uses machine learning models in Facebook's FBLearner Flow to identify a relevance-score threshold. Additionally, or alternatively, in some embodiments, the social networking system 102 uses a K-Nearest Neighbors, linear regression, logistic regression, Naive Bayes, or Support Vector Machine algorithm to iteratively process relevance scores and crowdsourced information to identify a relevance-score threshold.

By iteratively comparing relevance scores for direct digital messages generated by the social networking system 102 to later-collected crowdsourced information concerning a direct digital message, the social networking system 102 uses a machine learning model to determine a relevance score above which users will likely find a direct digital message relevant and below which users will likely find the direct digital message irrelevant.

The social networking system 102 then compares the relevance-score threshold to a generated relevance threshold. In some embodiments, the social networking system 102 determines that the relevance score for a direct digital message exceeds the relevance-score threshold. By contrast, in some embodiments, the social networking system 102 determines that the relevance score for a direct digital message falls below the relevance-score threshold.

The social networking system 102's comparison of a relevance score to relevance-score threshold determines how the social networking system 102 provides the direct digital message from the sender to the recipient. As shown in FIG. 2C, the social networking system 102 performs the act 214 of providing the direct digital message to the client device 108b. If the relevance score for the direct digital message exceeds the relevance-score threshold, the social networking system 102 provides the direct digital message to the client device 108b for display within a received-messages preview. When a relevance score exceeds the relevance-score threshold, the social networking system 102 provides the direct digital message to the client device 108b for display within a received-messages preview. If the relevance score for the direct digital messages falls below the relevance-score threshold, however, the social networking system 102 provides the direct digital message to the client device 108b for display within a sequestration folder (instead of for display within a received-messages preview).

Alternatively, if the relevance score for the direct digital message equals or is statistically equivalent to the relevance-score threshold, the social networking system 102 provides the direct digital message to the client device 108b according to a default setting. The default setting either prompts the client device 108b to present the direct digital message within a received-messages preview or to present the direct digital message within a sequestration folder.

To provide the direct digital message to a client device for display within a proper preview or folder, the social networking system 102 optionally sends data packets that encode the direct digital message and an indicator for the direct digital message's destination. For example, the social networking system 102 may send data packets that include an indicator indicating that the direct digital message should be displayed within a received-messages preview. As another example, the social networking system 102 may send data packets that include an indicator indicating that the direct digital message should be displayed within a sequestration folder.

After receiving the direct digital message, in some embodiments, the client device 108b detects a selection by the user 112b that the direct digital message is an unsolicited message. For example, the client device 108b optionally detects a selection by the user 112b of an unsolicited-tag option for the direct digital message. To gather such crowdsourced information, per the instructions within the messaging application 110b, the client device 108b presents an unsolicited-tag option corresponding to the direct digital message in either one or both a received-messages preview or a sequestration folder. As described below, FIGS. 4A and 4B depict examples of unsolicited-tag options.

A selection of an unsolicited-tag option prompts a client device to update crowdsourced information. As further shown in FIG. 2C, the client device 108b optionally performs the act 216 of sending an indication that the direct digital message is an unsolicited message to the social networking system 102. The social networking system 102 in turn receives the indication. This indication provides a form of crowdsourced information. In some embodiments, the indication triggers the social networking system 102 to update the crowdsourced information concerning the sender.

Accordingly, as shown in FIG. 2C, the social networking system 102 optionally performs the act 218 of updating the crowdsourced information concerning the sender. In some embodiments, the social networking system 102 updates the crowdsourced information at predetermined intervals by analyzing or searching for (a) newly received indications that the sender's direct digital messages are unsolicited messages, (b) newly received users' responses to the sender's direct digital messages, or (c) new reviews of the sender's page or timeline.

Alternatively, in some embodiments, the social networking system 102 updates the crowdsourced information upon the occurrence of an event relevant to the crowdsourced information concerning the sender. In other words, the social networking system 102 optionally updates the crowdsourced information upon each newly received indication that the sender's direct digital messages are unsolicited messages, each newly received users' response to the sender's direct digital messages, or each newly detected review of the sender's page or timeline.

As further shown in FIG. 2C, the social networking system 102 optionally performs the act 220 of updating the social-network signals concerning the sender. In some embodiments, the social networking system 102 updates the social-network signals at predetermined intervals by re-determining an affinity coefficient for the recipient relative to the sender or re-determining account information associated with the sender (e.g., re-determining whether a profile associated with the account of the sender includes an appropriated image). Additionally, or alternatively, the social networking system 102 updates the social-network signals at predetermined intervals by re-determining whether the account of the sender is connected to contacts that are connected to each other or re-determining social-network actions performed by the sender (e.g., re-determining a number of pages or users followed or liked by the sender, re-determining a time since the account was created for the sender).

In the alternative to predetermined intervals, in some embodiments, the social networking system 102 updates the social-network signals upon the occurrence of an event relevant to the social-network signals concerning the sender. For example, the social networking system 102 optionally updates the social-network signals upon adding each new edge connected to the user node representing the sender or each new edge within one degree of separation from the user node representing the sender, such as each new direct digital message or comment exchanged between the user 112a and the user 112b. Similarly, the social networking system 102 optionally updates the social-network signals upon adding additional account information associated with the sender or logging or tracking each new action performed by the sender.

As shown by FIG. 2C, after updating either or both of the crowdsourced information and social-network signals, the social networking system 102 optionally performs the act 222 of updating the relevance score. When updating the relevance score, the social networking system 102 optionally regenerates the relevance score using the same function it used to initially generate the relevance score. Alternatively, if the social networking system 102 identifies or determines a previously absent item of crowdsourced information or social-network signal, the social networking system 102 adjusts the function to account for the newly identified or newly determined item of crowdsourced information or social-network signal. Although FIG. 2C indicates that the social networking system 102 updates the relevance score, in some embodiments, the recipient's client device (e.g., client device 108b) updates the relevance score. For example, the recipient's client device may update the relevance score based on newly received direct digital messages or newly received comments on the recipient's timeline or page.

Updating the relevance score sometimes triggers the social networking system 102 to take corrective action to adjust the presentation of the direct digital message. As further shown in FIG. 2C, the social networking system 102 optionally performs the act 224 of sending a notice to remove the direct digital message from the received-messages preview. Conversely, the social networking system 102 optionally performs the act 226 of sending a notice to remove the direct digital message from a sequestration folder.

For example, when the social networking system 102 decreases a relevance score that previously exceeded the relevance-score threshold such that the updated relevance score falls below the relevance-score threshold, the social networking system 102 sends a notice to the client device 108b to remove the direct digital message from the received-messages preview and to add the direct digital message to the sequestration folder. By contrast, when the social networking system 102 increases a relevance score that previously fell below the relevance-score threshold such that the updated relevance score exceeds the relevance-score threshold, the social networking system 102 optionally sends a notice to the client device 108b to remove the direct digital message from the sequestration folder and to add the direct digital message to the received-messages preview.

Although not shown in FIG. 2C, the social networking system 102 may also take similar corrective action to relocate an additional instance of a direct digital message based on an updated relevance score. For example, when the social networking system 102 decreases a relevance score that previously exceeded the relevance-score threshold such that the updated relevance score falls below the relevance-score threshold, the social networking system 102 sends a notice to the client device 108n to remove an additional instance of the direct digital message from an additional received-messages preview and to add the additional instance of the direct digital message to an additional sequestration folder. By contrast, when the social networking system 102 increases a relevance score that previously fell below the relevance-score threshold such that the updated relevance score exceeds the relevance-score threshold, the social networking system 102 sends a notice to the client device 108n to remove an additional instance of the direct digital message from an additional sequestration folder and to add the additional instance of the direct digital message to an additional received-messages preview.

Figure 3:
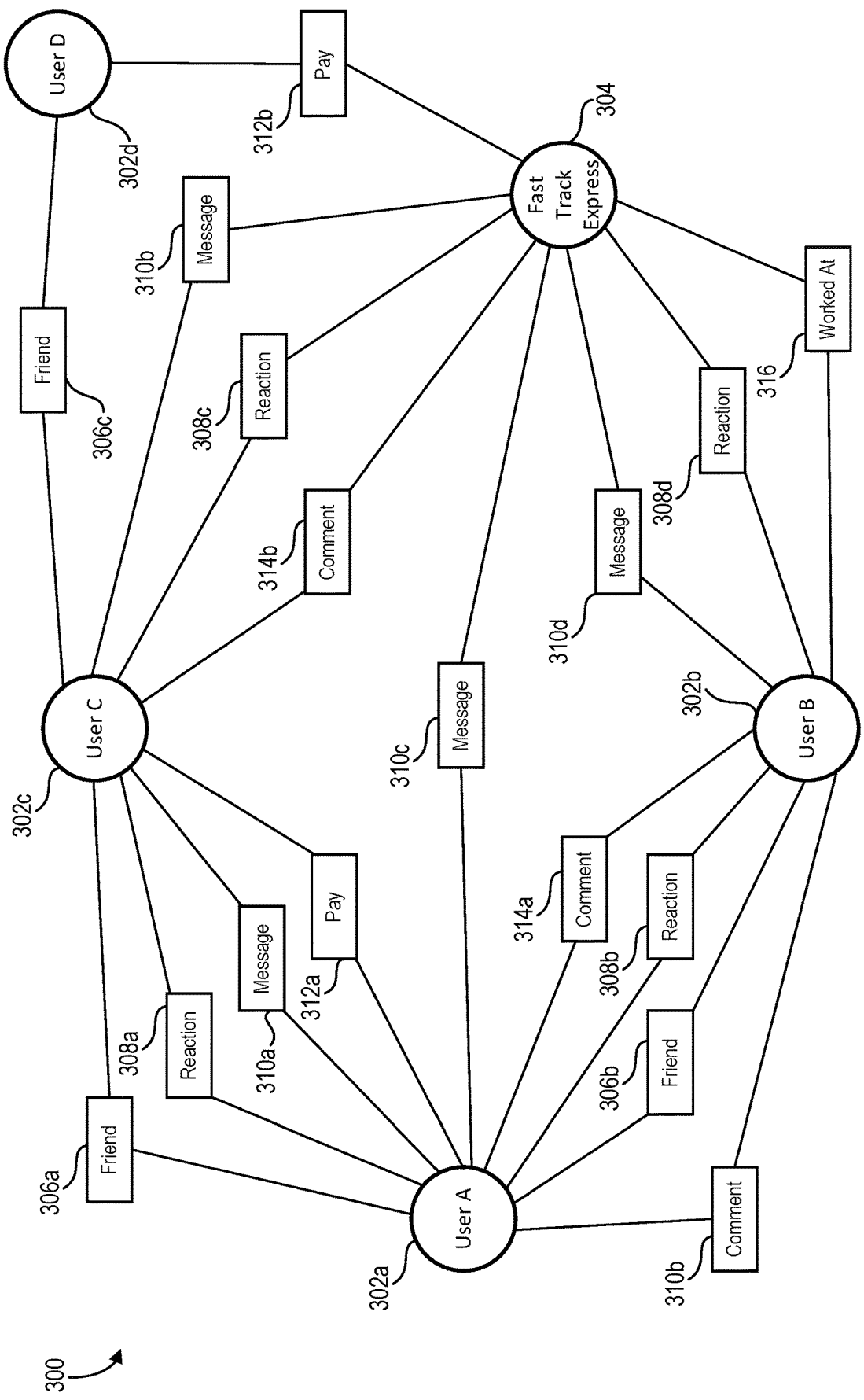
FIG. 3 illustrates a portion of a social graph comprising nodes for a sender and for a recipient of a direct digital message in accordance with one or more embodiments.

Turning now to FIG. 3, this figure illustrates an example of a social graph 300. The social graph 300 comprises a user node 304 representing a sender of a direct digital message and a user node 302a representing a recipient of the direct digital message in accordance with one or more embodiments. As depicted in FIG. 3, the social graph 300 is a portion of a larger social graph that the social networking system 102 uses to generate an affinity coefficient representing a recipient's affinity for a sender and to identify certain social-network signals. Such social-network signals may include, but are not limited to, determining a number of reactions to posts or comments attributed to a sender or determining a number of pages or users followed or liked by a sender.

As shown in FIG. 3, the social graph 300 comprises user nodes 302a-304 interconnected by edges 306a-316. As users create accounts and profiles, the social networking system 102 creates the user nodes 302a-304. The user nodes 302a, 302b, 302c, and 302d each represent an individual user who creates an account for a person with profile information. The user node 302a represents "User A"; the user node 302b represent "User B"; the user node 302c represents "User C"; the user node 302d represents "User D." By contrast, the user node 304 represents a corporation that creates an account for an organization with profile information and an associated page. Specifically, the user node 304 represents the "Fast Track Express," although some other entity could be used in this example.

As suggested by FIG. 3, the corporation sends a direct digital message to the User A. The social networking system 102 represents that the corporation sent the User A a direct digital message by creating a message edge 310c within the social graph 300. While such a message edge may also be called a direct-digital-messaging edge, this disclosure primarily refers to such an edge as a message edge. The message edge 310c represents a direct connection between the corporation and the User A. As shown, the user node 302a and the user node 304 have no other edges that represent a direct connection within the social networking system 102. Among other things, the other edges 306a-310d and 312a-316 represent indirect connections between the user node 302a and the user node 304.

Similar to the message edge 310c, the social networking system 102 creates the edges 306a-310d and 312a-316 based on actions performed and information entered within the social networking system 102. When the social networking system 102 receives certain indications that users accepts friend requests, for example, the social networking system 102 creates friend edges 306a-306c that connect the user nodes representing the users who formed the relationship. As shown in FIG. 3, the friend edge 306a represents a friend relationship between the User A and the User C, the friend edge 306b represents a friend relationship between the User A and the User B, and the friend edge 306c represents a friend relationship between the User C and the User D.

Similarly, when the social networking system 102 receives certain indications of users' reactions to a comment or post of another user—such as selections and posts of emoji reactions to a post or comment—the social networking system 102 creates reaction edges 308a-308d that connect the user nodes representing the users between whom the reactions are exchanged. As shown in FIG. 3, the reaction edge 308a represents a reaction emoji the User A selects in response to a post or comment by the User C, the reaction edge 308b represents a reaction emoji the User A selects in response to a post or comment by the User B, the reaction edge 308c represents a reaction emoji the User C selects in response to a post or comment by the corporation, and the reaction edge 308d represents a reaction emoji the User B selects in response to a post or comment by the corporation.

Likewise, when the social networking system 102 receives certain direct digital messages from one user to send to another user, the social networking system 102 creates message edges 310a-310d that connect the user nodes representing the users between whom the direct digital messages are exchanged. As shown in FIG. 3, the message edge 310a represents a direct digital message the User C sends to the User A, the message edge 310b represents a direct digital message the User C sends to the corporation, the message edge 310c represents a direct digital message the corporation sends to the User A, and the message edge 310d represents a direct digital message the corporation sends to the User B.

As part of tracking social-network signals, the social networking system 102 also tracks and represents payments through a messaging application in the social graph 300. Accordingly, when the social networking system 102 processes certain payments from one user to another user through instances of a messaging application, the social networking system 102 creates payment edges 312a and 312b that connect the user nodes representing the users between whom the payments are exchanged. As shown in FIG. 3, the payment edge 312a represents a payment from the User A to the User C, and the payment edge 312b represents a payment from the User D to the corporation.

As further shown in FIG. 3, the social networking system 102 tracks and represents comments within the social graph 300. When the social networking system 102 receives certain comments from one user to post on a timeline or page of another user, the social networking system 102 creates comment edges 314a and 314b that connect the user nodes corresponding to the user who posted a comment and the user to whose timeline or page the comment is addressed. As shown in FIG. 3, the comment edge 314a represents a comment posted by the User A to a timeline or page of the User B, and the comment edge 314b represents a comment posted by the User C to a timeline or page of the corporation. In certain embodiments, the comment edge 314a represents a "birthday comment" posted on a birthdate of the User B with a message for the User B's birthday. Finally, when the social networking system 102 receives an entry for the User B's profile information indicating that the User B worked at the corporation, the social networking system 102 creates a work edge 316 that connects the user node 302b to the user node 304.

As noted above, the social networking system 102 uses the social graph 300 to generate an affinity coefficient representing the User A's affinity relative to (or for) the corporation. In some embodiments, the social networking system 102 generates an affinity coefficient based on the type of relationship between and among nodes. For example, the social networking system 102 may analyze either or both of the number and type of edges 306a-316 directly and indirectly connecting the user node 302a and the user node 304 when generating an affinity coefficient.

The social networking system 102 also may assign greater weights to edges that represent more important relationships or actions when generation an affinity coefficient. As an example and not by way of limitation, the social networking system 102 may assign a higher weight to the friend edge 306b connecting the user nodes 302a and 302b than the weight assigned to the reaction edge 308d connecting the user node 302b to the user node 305. The friendship relationship presumably indicates a higher affinity than the reaction relationship. In other words, depending upon the weights assigned to the actions and relationships for a particular user, the overall affinity may be determined to be higher for content about a user's friend than for content about another user's reaction to a comment or post. In particular embodiments, the relationships a user has with another object may affect the weights and/or the ratings of the user's actions with respect to generating the affinity coefficient for that object.

As another example and not by way of limitation, if a first user is connected to or has a high affinity coefficient for one or more second users—and those second users are connected to or have a high affinity coefficient for a particular object—the social networking system 102 may determine that the first user should also have a relatively high affinity coefficient for the particular object. In particular embodiments, the coefficient may be based on the degree of separation between particular objects. Degree of separation between any two nodes refers to the minimum number of hops required to traverse the social graph 300 from one node to the other. A degree of separation between two nodes can be considered a measure of relatedness between the users or the concepts represented by the two nodes in the social graph. This disclosure describes degrees of separation further below with reference to FIG. 8.

As shown in FIG. 3, the social networking system 102 determines that the User A has a relatively high affinity coefficient for the corporation in part because the User A is connected by a friend relationship to the User B and the User C, each of whom have relatively high affinity coefficients for the corporation. As indicated by the edges 308d, 310d, and 316 that connect the user node 302b to the user node 304, the social networking system 102 determines that the User B has a relatively high affinity for the corporation in part because User B received a direct digital message from, reacted to a post or comment of, and worked at the corporation. As indicated by the edges 308c, 310b, and 314b that connect the user node 302c to the user node 304, the social networking system 102 determines that the User C has a relatively high affinity for the corporation in part because the User C reacted to a post or comment of, sent a direct digital message to, and posted a comment to a timeline or page of the corporation.

Turning now to FIGS. 4A and 4B, these figures generally illustrate the client device 108b presenting direct digital messages within a received-messages preview and within a sequestration folder. As suggested above, the messaging application 110b comprises computer-executable instructions that cause the client device 108b to perform tasks depicted in FIGS. 4A and 4B. Rather than repeatedly describe the computer-executable instructions within the messaging application 110b as causing the client device 108b to perform such tasks, this disclosure primarily describes the client device 108b as simply performing tasks as a shorthand for that relationship. Moreover, while this disclosure refers to touch gestures as examples of user interactions when describing FIGS. 4A and 4B, in additional or alternative embodiments, the client device 108b detects any suitable user interaction, including, but not limited to, a mouse click, stylus interaction, or a keyboard input.

As shown in FIG. 4A, the client device 108b presents a received-messages preview 406 within a graphical user interface 404 ("GUI 404") of a touch screen 402. The GUI 404 represents a home screen that the client device 108b presents upon opening the messaging application 110b. Specifically, in response to detecting a selection of a messaging-application icon by a selection gesture, the client device 108b initiates the messaging application 110b and presents the GUI 404. As part of presenting the received-messages preview 406, the client device 108b presents preview messages for direct digital messages.

As shown within the GUI 404, the received-messages preview 406 includes messaging-thread previews 410a-410d. Each of the messaging-thread previews 410a-410d include a preview message that provides a sample of a direct digital message last added to a messaging thread. In particular, the messaging-thread previews 410a, 410b, 410c, and 410d respectively comprise preview messages 408a, 408b, 408c, and 408d. The social networking system 102 provides the direct digital messages previewed within the messaging-thread previews 410a-410d for display within the received-messages preview 406. Consistent with the disclosure above, the social networking system 102 provides the direct digital messages previewed within the messaging-thread previews 410a and 410b to the client device 108b for display within the received-messages preview 406 because of a determined connection between recipient and senders. Specifically, the social networking system 102 determines that the user 112b is connected (by an invitation and acceptance) as "friends" to the senders of the direct digital messages previewed within the messaging-thread previews 410a and 410b.

The social networking system 102 provides the direct digital messages previewed within the messaging-thread previews 410c and 410d to the client device 108b for display within the received-messages preview 406 for a different reason. Consistent with the disclosure above, the social networking system 102 receives the direct digital messages previewed within the messaging-thread previews 410c and 410d and generates relevance scores for each direct digital message based on crowdsourced information and social-network signals. Because the social networking system 102 determines that the relevance score for each direct digital message previewed within the messaging-thread previews 410c and 410d exceeds a relevance-score threshold, the social networking system 102 provides the direct digital messages previewed within the messaging-thread previews 410c and 410d to the client device 108b for display within the received-messages preview 406.

As suggested above, in some embodiments, the social networking system 102 provides options for a recipient to confirm or reject that a direct digital message is relevant to or solicited by the recipient. As shown in FIG. 4A, per the instructions of the messaging application 110b, the client device 108b optionally presents a confirmation option 412a and an unsolicited-tag option 414a corresponding to the direct digital message previewed within the messaging-thread preview 410c. Similarly, the client device 108b optionally presents a confirmation option 412b and an unsolicited-tag option 414b corresponding to the direct digital message previewed within the messaging-thread preview 410d.

In response to detecting a selection of the confirmation option 412a by touch gesture, the client device 108b sends an indication to the social networking system 102 that the direct digital message previewed within the messaging-thread preview 410c is relevant to the user 112b. When selected, the confirmation option 412b similarly triggers the client device 108b to send an indication to the social networking system 102 that the direct digital message previewed within the messaging-thread preview 410d is relevant to the user 112b. By contrast, in response to detecting a selection of the unsolicited-tag option 414a by touch gesture, the client device 108b sends an indication to the social networking system 102 that the direct digital message previewed within the messaging-thread preview 410c is an unsolicited message and not relevant to the user 112b. When selected, the unsolicited-tag option 414b similarly triggers the client device 108b to send an indication to the social networking system 102 that the direct digital message previewed within the messaging-thread preview 410d is an unsolicited message and not relevant to the user 112b.

In addition to identifying an unsolicited message, in some embodiments, the unsolicited-tag options 414a and 414b triggers additional actions. In certain embodiments, in response to detecting a selection of the unsolicited-tag options 414a and 414b by touch gesture, the client device 108b respectively deletes the direct digital message previewed within the messaging-thread preview 410c and the direct digital message previewed within the messaging-thread preview 410d. Alternatively, in response to detecting a selection of the unsolicited-tag options 414a and 414b by touch gesture, the client device 108b respectively removes the direct digital message previewed within the messaging-thread preview 410c—and the direct digital message previewed within the messaging-thread preview 410d—from the received-messages preview 406 and sequesters the message within a sequestration folder.

In alternative embodiments, rather than providing unsolicited-tag option 414b, the client device 108b can determine whether the user deletes a messaging-thread preview before opening the messaging-thread or ignores the messaging-thread preview for a predetermined amount of time or views. If the user deletes a messaging-thread preview before opening the messaging-thread or ignores the messaging-thread preview for a predetermined amount of time or views, the client device 108b performs the steps described as being performed in response to the selection of the unsolicited-tag option 414b. Similarly, rather than providing unsolicited-tag option 414a, the client device 108b can determine whether the user accesses a messaging-thread preview or responds to the message. If the user accesses a messaging-thread preview or responds to the message, the client device 108b performs the steps described as being performed in response to the selection of the unsolicited-tag option 414a.

FIG. 4B illustrates the contents of a sequestration folder. In particular, the client device 108b presents a sequestration-folder preview 416 within the GUI 404 of the touch screen 402. As its name implies, the sequestration-folder preview 416 is a graphical display of directed digital messages that the client device 108b sequesters within the sequestration folder. The sequestration-folder preview 416 includes messaging-thread previews 410e-410g. The sequestration-folder preview 416 also optionally includes the messaging-thread preview 410d.

As suggested above, the social networking system 102 provides the direct digital messages previewed within the messaging-thread previews 410e-410g to the client device 108b for display within the sequestration folder. Consistent with the disclosure above, the social networking system 102 receives the direct digital messages previewed within the messaging-thread previews 410e-410g and generates a relevance score for each direct digital message based on crowdsourced information and social-network signals. Because the social networking system 102 determines that the relevance score for each direct digital message previewed within the messaging-thread previews 410e-410g fall below a relevance-score threshold, the social networking system 102 provides the direct digital messages previewed within the messaging-thread previews 410e-410g to the client device 108b for display within the sequestration-folder preview 416.

As shown in FIG. 4B, the client device 108b presents the messaging-thread preview 410d within the sequestration-folder preview 416 for a different reason. In response to detecting a selection of the unsolicited-tag option 414b by touch gesture, the client device 108b optionally removes the direct digital message previewed within the messaging-thread preview 410d from the received-messages preview 406 and sequesters the message within a sequestration folder for display within the sequestration-folder preview 416.

Similar to the confirmation and unsolicited-tag options within the received-messages preview 406, the social networking system 102 also provides options for a recipient to confirm or reject that a direct digital message is irrelevant to or unsolicited by the recipient in the sequestration-folder preview 416. As shown in FIG. 4B, per the instructions of the messaging application 110b, the client device 108b presents confirmation options and unsolicited-tag options corresponding to the direct digital messages previewed within the messaging-thread previews 410d and 410e-410g.

In response to detecting a selection of a confirmation option 412c by touch gesture, for example, the client device 108b sends an indication to the social networking system 102 that the direct digital message previewed within the messaging-thread preview 410e is relevant to the user 112b. When selected, the confirmation option 412c also triggers the client device 108b to remove the direct digital message previewed within the messaging-thread preview 410e from the sequestration-folder preview 416 and to add the direct digital message to the received-messages preview 406. The confirmation options shown in the messaging-thread previews 410d, 410f, and 410g function in the same way with respect to their respective direct digital messages.

By contrast, in response to detecting a selection of an unsolicited-tag option 414c by touch gesture, for example, the client device 108b sends an indication to the social networking system 102 that the direct digital message previewed within the messaging-thread preview 410e is irrelevant to the user 112b. When selected, the unsolicited-tag option 414c also triggers the client device 108b to delete the direct digital message previewed within the messaging-thread preview 410e. Before deleting the direct digital message, the client device 108b optionally presents a deletion-confirmation option 418 and a cancellation option 420 within the GUI 404. Upon detecting a selection of the deletion-confirmation option 418, the client device 108b deletes the direct digital message previewed within the messaging-thread preview 410e. Upon detecting a selection of the cancellation option 420, the client device 108b maintains the direct digital message previewed within the messaging-thread preview 410e for di splay within the sequestration-folder preview 416. The unsolicited-tag options shown in the messaging-thread previews 410d, 410f, and 410g function in the same way as the unsolicited-tag option 414c with respect to their respective direct digital messages.

Figure 5:
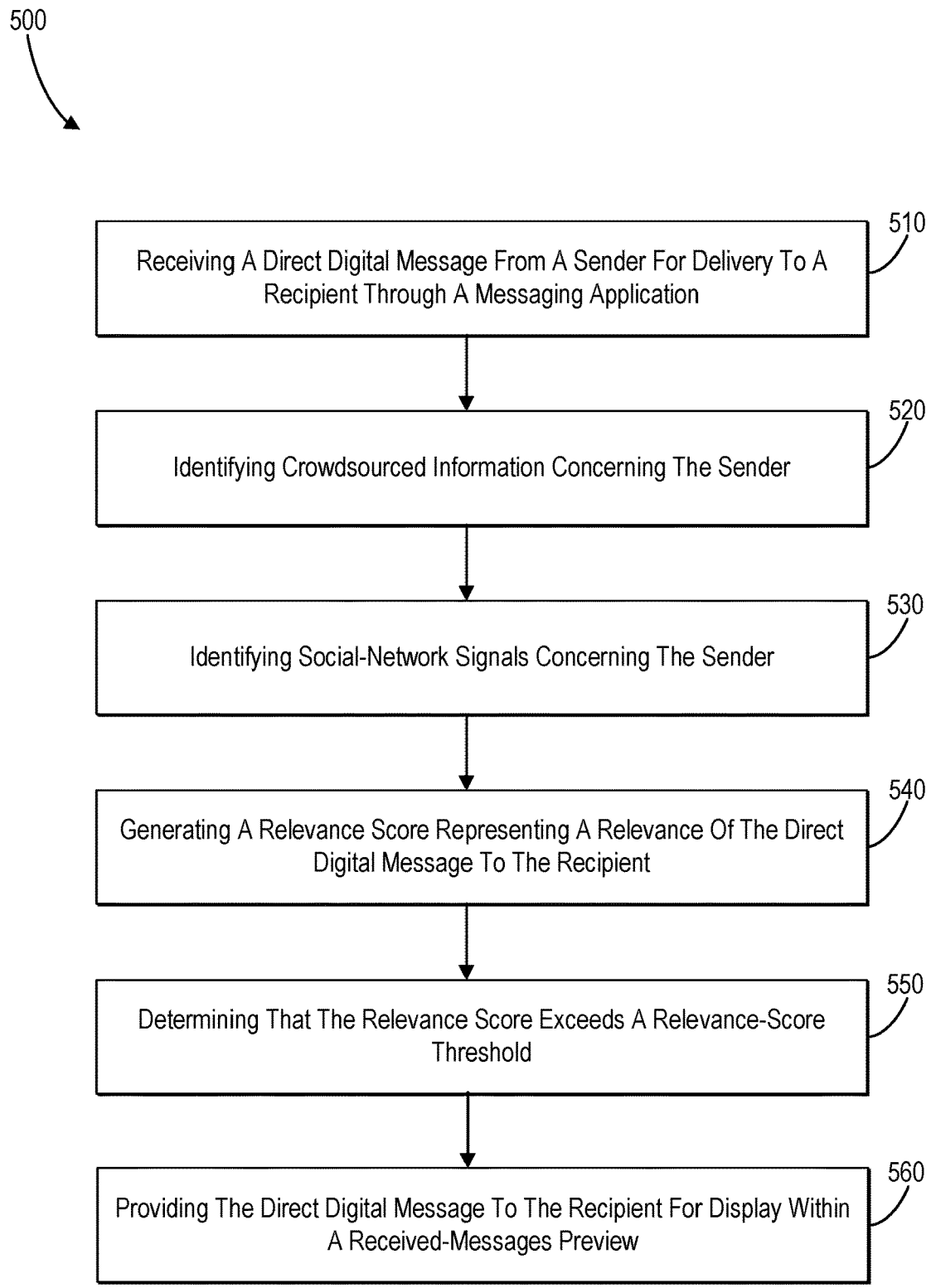
FIG. 5 illustrates a flowchart of a series of acts in a method of generating a relevance score representing a direct digital message's relevance to a recipient based on crowdsourced information and social-network signals in accordance with one or more embodiments.

Turning now to FIG. 5, this figure illustrates a flowchart of a series of acts 500 of generating a relevance score representing a direct digital message's relevance to a recipient in accordance with one or more embodiments. While FIG. 5 illustrates acts according to one embodiment, alternative embodiments may omit, add to, reorder, and/or modify any of the acts shown in FIG. 5. The acts of FIG. 5 can be performed as part of a method. Alternatively, a non-transitory computer readable storage medium can comprise instructions that, when executed by one or more processors, cause a computing device to perform the acts depicted in FIG. 5. In still further embodiments, a system can perform the acts of FIG. 5.

As shown in FIG. 5, the acts 500 include an act 510 of receiving a direct digital message for delivery to a recipient through a messaging application. In particular, in some embodiments, the act 510 includes receiving a direct digital message from a first client device associated with a sender for delivery to a recipient through a messaging application of a social networking system.

As further shown in FIG. 5, the acts 500 include an act 520 of identifying crowdsourced information concerning the sender. For example, in certain embodiments, identifying crowdsourced information concerning the sender comprises identifying that one or more users of the social networking system have identified direct digital messages from the sender as unsolicited messages.

As another example, in some embodiments, identifying crowdsourced information concerning the sender comprises determining a probability that a user of the social networking system responds to direct digital messages from the sender. By contrast, in some embodiments, identifying crowdsourced information concerning the sender comprises analyzing reviews of a page on the social networking system associated with the sender.

As further shown in FIG. 5, the acts 500 include an act 530 of identifying social-network signals concerning the sender. For example, in some embodiments, identifying the social-network signals concerning the sender comprises determining an affinity coefficient for the recipient relative to the sender based on a social graph of the social networking system.

Relatedly, in some embodiments, determining the affinity coefficient for the recipient relative to the sender based on the social graph of the social networking system comprises analyzing a plurality of nodes connected by a plurality of edges within the social graph, the plurality of nodes comprising a first node representing the sender and a second node representing the recipient. Additionally, in certain embodiments, one or more of the plurality of edges comprises direct-digital-messaging edges, reaction edges, and comment edges connecting the first node to one or more of the plurality of nodes and connecting the second node to one or more of the plurality of nodes.

As another example, in certain embodiments, identifying the social-network signals concerning the sender comprises determining one or more of whether: a profile associated with an account of the sender includes an image of a person; the profile associated with the account of the sender includes an appropriated image or stock image; the account of the sender is connected to contacts that are connected to each other; or a timeline or page for the account includes images of one or more persons.

As yet another example, in some embodiments, identifying the social-network signals concerning the sender comprises determining one or more of: a number of images including one or more persons posted on a timeline or page for an account of the sender; a number of pages or users followed or liked by the sender; a number of comments posted by the sender on timelines or pages; a number of reactions to posts or comments attributed to the sender; a number of profile fields including information within profile information associated with an account of the sender; a number of birthday comments posted on a timeline or page associated with the account of the sender; a regularity of signing in to the account; or a time since the account was created for the sender.

As further shown in FIG. 5, the acts 500 include an act 540 of generating a relevance score representing a relevance of the direct digital message to the recipient. In particular, in some embodiments, the act 540 includes generating a relevance score representing a relevance of the direct digital message to the recipient based on the crowdsourced information and the social-network signals. As further shown in FIG. 5, the acts 500 include an act 550 of determining that the relevance score exceeds a relevance-score threshold.

Additionally, as further shown in FIG. 5, the acts 500 include an act 560 of providing the direct digital message to the recipient for display within a received-messages preview. In particular, in some embodiments, the act 560 includes, based on determining that the relevance score exceeds the relevance-score threshold, providing the direct digital message to a second client device associated with the recipient for display within a received-messages preview.

In addition to the acts 510-560, in some embodiments, the acts 500 further include determining that the sender and the recipient are not connected through the social networking system. Additionally, as noted above, in some embodiments, the social networking system 102 updates crowdsourced information, social-network signals, and relevance scores. Accordingly, in some embodiments, the acts 500 further include updating the social-network signals concerning the sender. Relatedly, in some embodiments, the acts 500 further include, based on the updated social-network signals concerning the sender: updating the relevance score representing the relevance of the direct digital message to the recipient; and sending a notice to the second client device associated with the recipient to remove the direct digital message from the received-messages preview and to add the direct digital message to the sequestration folder.

In some embodiments, the acts 500 further include updating the crowdsourced information concerning the sender. Relatedly, in some embodiments, the acts 500 further include, based on the updated crowdsourced information concerning the sender: updating the relevance score representing the relevance of the direct digital message to the recipient; and sending a notice to the second client device associated with the recipient to remove the direct digital message from the received-messages preview and to add the direct digital message to the sequestration folder.

Moreover, in certain embodiments, the acts 500 further include receiving an indication from the second client device that the direct digital message is an unsolicited message. Relatedly, in some embodiments, the acts 500 further include updating the crowdsourced information concerning the sender based on the indication from the second client device that the direct digital message is an unsolicited message. In one or more embodiments, the acts 500 also includes, based on the updated crowdsourced information concerning the sender, sending a notice to a third client device associated with a user of the social networking system to remove an additional instance of the direct digital message from an additional received-messages preview and to add the additional instance of the direct digital message to an additional sequestration folder.

As also noted above, in some embodiments, the social networking system 102 provides direct digital messages to a client device for display within a sequestration folder. Accordingly, in some embodiments, the acts 500 further include receiving an additional direct digital message from a third client device associated with an additional sender for delivery to the recipient through the messaging application. The acts 500 can involve identifying additional crowdsourced information concerning the additional sender. The acts 500 can involve identifying additional social-network signals for the additional sender and generating an additional relevance score representing a relevance of the additional direct digital message to the recipient based on the additional crowdsourced information and the additional social-network signals. Additionally, the acts 500 can involve determining that the additional relevance score falls below the relevance-score threshold. Based on determining that the relevance score falls below the relevance-score threshold, the acts 500 can involve providing the additional direct digital message to the second device associated with the recipient for display within a sequestration folder for direct digital messages instead of display within the received-messages preview.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
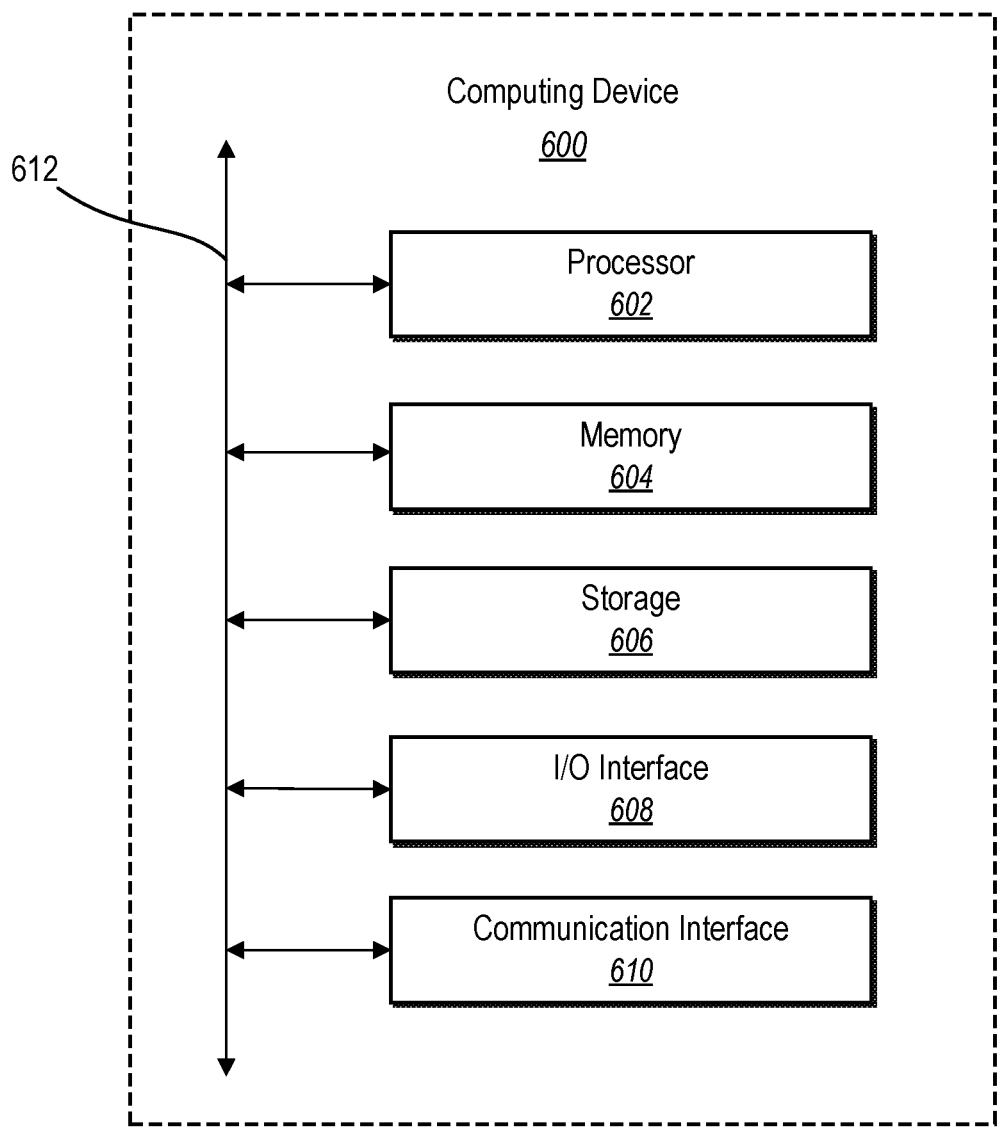
FIG. 6 illustrates a block diagram of an example computing device in accordance with one or more embodiments.

FIG. 6 illustrates a block diagram of exemplary computing device 600 that may be configured to perform one or more of the processes described above. One will appreciate that one or more computing devices such as the computing device 600 may implement the social networking system 102. As shown by FIG. 6, the computing device 600 can comprise a processor 602, a memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation lookaside buffers ("TLBs"). Instructions in the instruction caches may be copies of instructions in the memory 604 or the storage device 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive ("HDD"), flash memory, an optical disc, a magneto-optical disc, magnetic tape, or a Universal Serial Bus ("USB") drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 608 allows a user to provide input to, receive output from, and otherwise transfer data to and receive data from computing device 600. The I/O interface 608 may include a mouse, a keypad or a keyboard, a touchscreen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 610 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 610 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other visual media items to a user's profile page (typically known as "wall posts" or "timeline posts") or in a photo album, both of which may be accessible to other users of the social-networking system depending upon the user's configured privacy settings.

Figure 7:
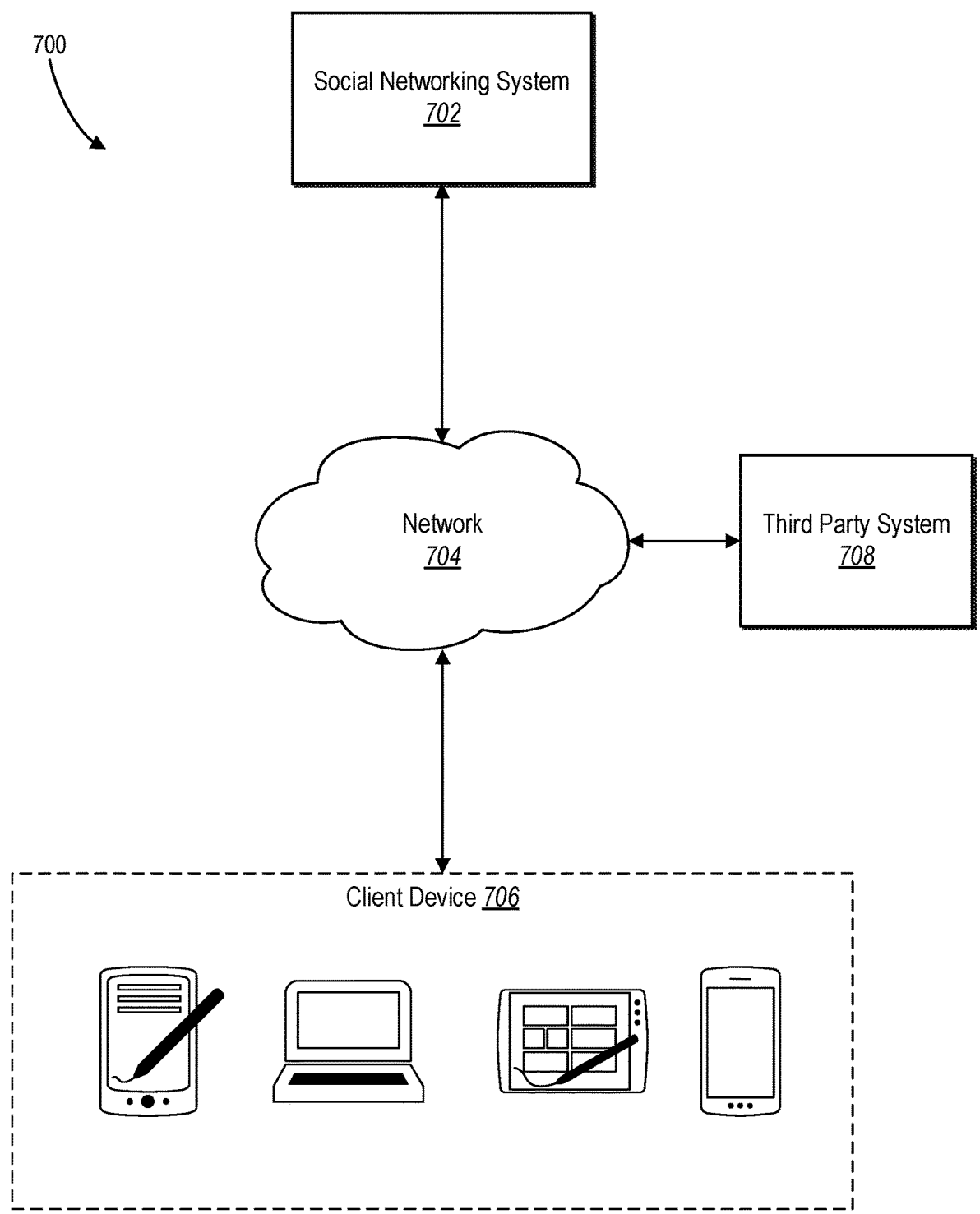
FIG. 7 illustrates a network environment of a networking system according to one or more embodiments.

FIG. 7 illustrates an example network environment 700 of a social-networking system. Network environment 700 includes a client device 706, a social networking system 702, and a third-party system 708 connected to each other by a network 704. Although FIG. 7 illustrates a particular arrangement of client device 706, social networking system 702, third-party system 708, and network 704, this disclosure contemplates any suitable arrangement of client device 706, social networking system 702, third-party system 708, and network 704. As an example and not by way of limitation, two or more of client device 706, social networking system 702, and third-party system 708 may be connected to each other directly, bypassing network 704. As another example, two or more of client device 706, social networking system 702, and third-party system 708 may be physically or logically co-located with each other in whole or in part. Moreover, although FIG. 7 illustrates a particular number of client devices 706, social networking systems 702, third-party systems 708, and networks 704, this disclosure contemplates any suitable number of client devices 706, social networking systems 702, third-party systems 708, and networks 704. As an example and not by way of limitation, network environment 700 may include multiple client devices 706, social networking systems 702, third-party systems 708, and networks 704.

This disclosure contemplates any suitable network 704. As an example and not by way of limitation, one or more portions of network 704 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 704 may include one or more networks 704.

Links may connect client device 706, social networking system 702, and third-party system 708 to communication network 704 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network ("SONET") or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client device 706 may be an electronic device including hardware, software, or embedded logic components or a combination of two or more such components and capable of carrying out the appropriate functionalities implemented or supported by client device 706. As an example and not by way of limitation, a client device 706 may include any of the computing devices discussed above in relation to FIG. 7. A client device 706 may enable a network user at client device 706 to access network 704. A client device 706 may enable its user to communicate with other users at other client devices 706.

In particular embodiments, client device 706 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 706 may enter a Uniform Resource Locator ("URL") or other address directing the web browser to a particular server (such as server, or a server associated with a third-party system 708), and the web browser may generate a Hyper Text Transfer Protocol ("HTTP") request and communicate the HTTP request to server. The server may accept the HTTP request and communicate to client device 706 one or more Hyper Text Markup Language ("HTML") files responsive to the HTTP request. Client device 706 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 702 may be a network-addressable computing system that can host an online social network. Social networking system 702 may generate, store, receive, and send social-networking data, such as, for example, user-profile data, concept-profile data, social-graph information, or other suitable data related to the online social network. Social networking system 702 may be accessed by the other components of network environment 700 either directly or via network 704. In particular embodiments, social networking system 702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 706, a social networking system 702, or a third-party system 708 to manage, retrieve, modify, add, or delete, the information stored in data store.

In particular embodiments, social networking system 702 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 702 may provide users of the online social network the ability to communicate and interact with other users. In particular embodiments, users may join the online social network via social networking system 702 and then add connections (e.g., relationships) to a number of other users of social networking system 702 whom they want to be connected to. Herein, the term "friend" may refer to any other user of social networking system 702 with whom a user has formed a connection, association, or relationship via social networking system 702.

In particular embodiments, social networking system 702 may provide users with the ability to take actions on various types of items or objects, supported by social networking system 702. As an example and not by way of limitation, the items and objects may include groups or social networks to which users of social networking system 702 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 702 or by an external system of third-party system 708, which is separate from social networking system 702 and coupled to social networking system 702 via a network 704.

In particular embodiments, social networking system 702 may be capable of linking a variety of entities. As an example and not by way of limitation, social networking system 702 may enable users to interact with each other as well as receive content from third-party systems 708 or other entities, or to allow users to interact with these entities through an application programming interfaces ("API") or other communication channels.

In particular embodiments, a third-party system 708 may include one or more types of servers, one or more data stores, one or more interfaces, including but not limited to APIs, one or more web services, one or more content sources, one or more networks, or any other suitable components, e.g., that servers may communicate with. A third-party system 708 may be operated by a different entity from an entity operating social networking system 702. In particular embodiments, however, social networking system 702 and third-party systems 708 may operate in conjunction with each other to provide social-networking services to users of social networking system 702 or third-party systems 708. In this sense, social networking system 702 may provide a platform, or backbone, which other systems, such as third-party systems 708, may use to provide social-networking services and functionality to users across the Internet.

In particular embodiments, a third-party system 708 may include a third-party content object provider. A third-party content object provider may include one or more sources of content objects, which may be communicated to a client device 706. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 702 also includes user-generated content objects, which may enhance a user's interactions with social networking system 702. User-generated content may include anything a user can add, upload, send, or "post" to social networking system 702. As an example and not by way of limitation, a user communicates posts to social networking system 702 from a client device 706. Posts may include data such as status updates or other textual data, location information, photos, videos, links, music or other similar data or media. Content may also be added to social networking system 702 by a third-party through a "communication channel," such as a newsfeed or stream.

In particular embodiments, social networking system 702 may include a variety of servers, sub-systems, programs, modules, logs, and data stores. In particular embodiments, social networking system 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 702 may also include suitable components such as network interfaces, security mechanisms, load balancers, failover servers, management-and-network-operations consoles, other suitable components, or any suitable combination thereof. In particular embodiments, social networking system 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 702 to one or more client devices 706 or one or more third-party system 708 via network 704. The web server may include a mail server or other messaging functionality for receiving and routing messages between social networking system 702 and one or more client devices 706. An API-request server may allow a third-party system 708 to access information from social networking system 702 by calling one or more APIs. An action logger may be used to receive communications from a web server about a user's actions on or off social networking system 702. In conjunction with the action log, a third-party-content-object log may be maintained of user exposures to third-party-content objects. A notification controller may provide information regarding content objects to a client device 706. Information may be pushed to a client device 706 as notifications, or information may be pulled from client device 706 responsive to a request received from client device 706. Authorization servers may be used to enforce one or more privacy settings of the users of social networking system 702. A privacy setting of a user determines how particular information associated with a user can be shared. The authorization server may allow users to opt in to or opt out of having their actions logged by social networking system 702 or shared with other systems (e.g., third-party system 708), such as, for example, by setting appropriate privacy settings. Third-party-content-object stores may be used to store content objects received from third parties, such as a third-party system 708. Location stores may be used for storing location information received from client devices 706 associated with users. Advertisement-pricing modules may combine social information, the current time, location information, or other suitable information to provide relevant advertisements, in the form of notifications, to a user.

Figure 8:
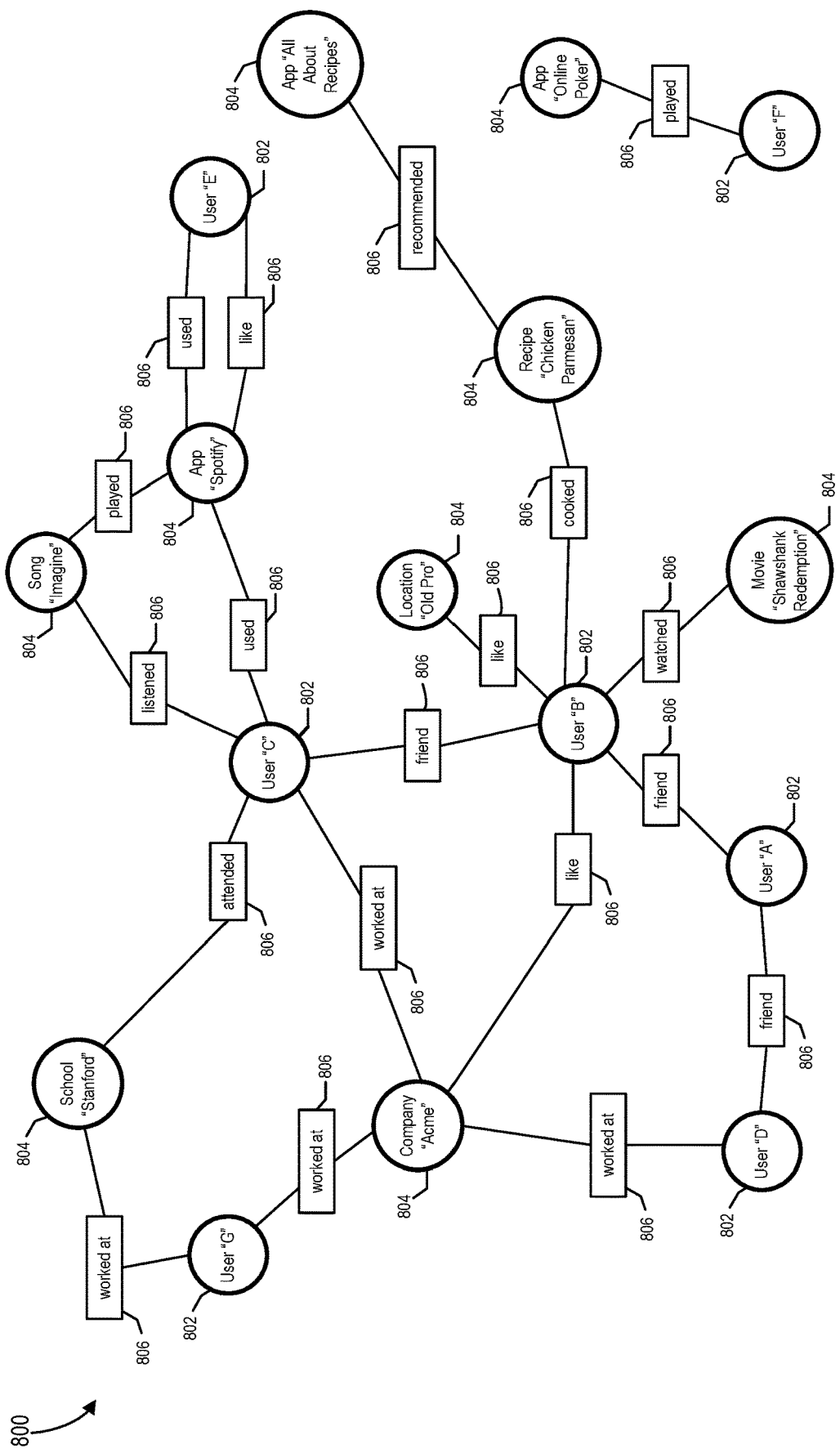
FIG. 8 illustrates an example social graph for a networking system in accordance with one or more embodiments.

FIG. 8 illustrates example social graph 800. In particular embodiments, social networking system 702 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social networking system 702, client device 706, or third-party system 708 may access social graph 800 and related social-graph information for suitable applications. The nodes and edges of social graph 800 may be stored as data objects, for example, in a data store (such as a social-graph database). Such a data store may include one or more searchable or query able indexes of nodes or edges of social graph 800.

In particular embodiments, a user node 802 may correspond to a user of social networking system 702. As an example and not by way of limitation, a user may be an individual (human user), an entity (e.g., an enterprise, business, or third-party application), or a group (e.g., of individuals or entities) that interacts or communicates with or over social networking system 702. In particular embodiments, when a user registers for an account with social networking system 702, social networking system 702 may create a user node 802 corresponding to the user, and store the user node 802 in one or more data stores. Users and user nodes 802 described herein may, where appropriate, refer to registered users and user nodes 802 associated with registered users. In addition, or as an alternative, users and user nodes 802 described herein may, where appropriate, refer to users that have not registered with social networking system 702. In particular embodiments, a user node 802 may be associated with information provided by a user or information gathered by various systems, including social networking system 702. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 804 may correspond to a concept. As an example and not by way of limitation, a concept may correspond to a place (such as, for example, a movie theater, restaurant, landmark, or city); a website (such as, for example, a website associated with social networking system 702 or a third-party website associated with a web-application server); an entity (such as, for example, a person, business, group, sports team, or celebrity); a resource (such as, for example, an audio file, video file, digital photo, text file, structured document, or application) which may be located within social networking system 702 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including social networking system 702. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept nodes 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social networking system 702. Profile pages may also be hosted on third-party websites associated with a third-party system 708. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept nodes 804.

In particular embodiments, a concept node 804 may represent a third-party webpage or resource hosted by a third-party system 708. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 706 to send to social networking system 702 a message indicating the user's action. In response to the message, social networking system 702 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social networking system 702 may send a "friend request" to the second user. If the second user confirms the "friend request," social networking system 702 may create an edge 806 connecting the first user's user node 802 to the second user's user node 802 in social graph 800 and store edge 806 as social-graph information in one or more of data stores. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social networking system 702 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 702 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social networking system 702 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept nodes 804 for "SPOTIFY").

In particular embodiments, social networking system 702 may create an edge 806 between a user node 802 and a concept node 804 in social graph 800. As an example and not by way of limitation, a user viewing a concept-profile page (such as, for example, by using a web browser or a special-purpose application hosted by the user's client device 706) may indicate that he or she likes the concept represented by the concept nodes 804 by clicking or selecting a "Like" icon, which may cause the user's client device 706 to send to social networking system 702 a message indicating the user's liking of the concept associated with the concept-profile page. In response to the message, social networking system 702 may create an edge 806 between user node 802 associated with the user and concept nodes 804, as illustrated by "like" edge 806 between the user and concept nodes 804. In particular embodiments, social networking system 702 may store an edge 806 in one or more data stores. In particular embodiments, an edge 806 may be automatically formed by social networking system 702 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social networking system 702). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 702 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 702) or RSVP (e.g., through social networking system 702) to an event associated with the advertisement. In addition or as an alternative, an advertisement may include social-networking-system context directed to the user. As an example and not by way of limitation, an advertisement may display information about a friend of the user within social networking system 702 who has taken an action associated with the subject matter of the advertisement.

In particular embodiments, social networking system 702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 708 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 702 may calculate a coefficient based on a user's actions. Social networking system 702 may monitor such actions on the online social network, on a third-party system 708, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 702 may calculate a coefficient based on the user's actions with particular types of content. The content may be associated with the online social network, a third-party system 708, or another suitable system. The content may include users, profile pages, posts, news stories, headlines, instant messages, chat room conversations, emails, advertisements, pictures, video, music, other suitable objects, or any combination thereof. Social networking system 702 may analyze a user's actions to determine whether one or more of the actions indicate an affinity for subject matter, content, other users, and so forth. As an example and not by way of limitation, if a user may make frequently posts content related to "coffee" or variants thereof, social networking system 702 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 702 may calculate a coefficient based on the type of relationship between particular objects. Referencing the social graph 800, social networking system 702 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 702 may determine that the user has a higher coefficient with respect to the first photo than the second photo because having a tagged-in-type relationship with content may be assigned a higher weight and/or rating than having a like-type relationship with content. In particular embodiments, social networking system 702 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 702 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social networking system 702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 706 of the user). A first user may be more interested in other users or concepts that are closer to the first user. As an example and not by way of limitation, if a user is one mile from an airport and two miles from a gas station, social networking system 702 may determine that the user has a higher coefficient for the airport than the gas station based on the proximity of the airport to the user.

In particular embodiments, social networking system 702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 702 may provide information that is relevant to user's interests and current circumstances, increasing the likelihood that they will find such information of interest. In particular embodiments, social networking system 702 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 702 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 702 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 708 (e.g., via an API or other communication channel), or from another suitable system. In response to the request, social networking system 702 may calculate the coefficient (or access the coefficient information if it has previously been calculated and stored). In particular embodiments, social networking system 702 may measure an affinity with respect to a particular process. Different processes (both internal and external to the online social network) may request a coefficient for a particular object or set of objects. Social networking system 702 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or acts disclosed in U.S. patent application Ser. No. 11/503,093, filed 11 Aug. 2006, U.S. patent application Ser. No. 12/978,027, filed 22 Dec. 2010, U.S. patent application Ser. No. 12/978,265, filed 23 Dec. 2010, and U.S. patent application Ser. No. 13/642,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by social networking system 702 or shared with other systems (e.g., third-party system 708). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 708, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 702 may send a request to the data store for the object. The request may identify the user associated with the request and may only be sent to the user (or a client device 706 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

We claim:

1. A non-transitory computer readable medium storing instructions thereon that, when executed by at least one processor, cause a computer system to:
receive, from a sender client device associated with a sender, a first instance of a direct digital message for delivery to a first recipient and a second instance of the direct digital message for delivery to a second recipient through a messaging application of a social networking system;
identify social-network signals and crowdsourced information concerning the sender;
generate a first relevance score representing a relevance of the first instance of the direct digital message to the first recipient based on the social-network signals and the crowdsourced information concerning the sender and a second relevance score representing a relevance of the second instance of the direct digital message to the second recipient based on the social-network signals and the crowdsourced information concerning the sender;
determine that the first relevance score and the second relevance score exceeds a relevance-score threshold;
based on determining that the first relevance score and the second relevance score exceeds the relevance-score threshold, provide the first instance of the direct digital message to a first recipient client device associated with the first recipient for display within a first received-messages preview and the second instance of the direct digital message to a second recipient client device associated with the second recipient for display within a second received-messages preview;
receive an indication from the first recipient client device that the first instance of the direct digital message is unsolicited;
generate an updated second relevance score representing an updated relevance of the second instance of the direct digital message to the second recipient based on the indication that the first instance of the direct digital message is unsolicited; and
based on determining that the updated second relevance score falls below the relevance-score threshold, send a notice to the second recipient client device to remove the second instance of the direct digital message from the second received-messages preview and provide the second instance of the direct digital message for display within a sequestration folder.

2. The non-transitory computer readable medium of claim 1, further comprising instructions that, when executed by the at least one processor, cause the computer system to provide the first instance of the direct digital message to the first recipient client device for display within a first messaging-thread preview comprising a snippet of the direct digital message, a confirmation option embedded in the first messaging-thread preview to indicate the direct digital message is relevant to the first recipient, and an unsolicited-tag option embedded in the first messaging-thread preview to indicate the direct digital message is not relevant to the first recipient.

3. The non-transitory computer readable medium of claim 1, further comprising instructions that, when executed by the at least one processor, cause the computer system to identify the social-network signals concerning the sender by:
analyzing a plurality of edges connecting a plurality of nodes within a social graph by analyzing edges representing actions attributed to an account of the sender, the plurality of nodes comprising a node representing the sender and an additional node representing the first recipient; and
determining an affinity coefficient for the first recipient relative to the sender based on the analysis of the plurality of edges connecting the plurality of nodes within the social graph.

4. The non-transitory computer readable medium of claim 3, further comprising instructions that, when executed by the at least one processor, cause the computer system to:
determine an updated affinity coefficient for the first recipient relative to the sender based on an updated analysis of the plurality of edges connecting the plurality of nodes within the social graph;
update the first relevance score representing the relevance of the first instance of the direct digital message to the first recipient; and
based on the updated first relevance score, send a notice to the first recipient client device associated with the first recipient to remove the first instance of the direct digital message from the first received-messages preview and to add the first instance of the direct digital message to an additional sequestration folder.

5. The non-transitory computer readable medium of claim 3, wherein one or more of the plurality of edges comprises direct-digital-messaging edges, reaction edges, and comment edges connecting the node representing the sender to one or more of the plurality of nodes and connecting the additional node representing the first recipient to one or more of the plurality of nodes.

6. The non-transitory computer readable medium of claim 1, further comprising instructions that, when executed by the at least one processor, cause the computer system to identify the social-network signals concerning the sender by determining one or more of whether:
a profile associated with an account of the sender includes an image of a person;
the profile associated with the account of the sender includes an appropriated image or stock image;
the account of the sender is connected to contacts that are connected to each other; or
a timeline or page for the account includes images of one or more persons.

7. The non-transitory computer readable medium of claim 2, further comprising instructions that, when executed by the at least one processor, cause the computer system to receive the indication from the first recipient client device that the first instance of the direct digital message is unsolicited by receiving an indication of a selection of the unsolicited-tag option embedded in the first messaging-thread preview.

8. The non-transitory computer readable medium of claim 1, further comprising instructions that, when executed by the at least one processor, cause the computer system to identify the crowdsourced information concerning the sender by:
determining a probability that a user of the social networking system responds to direct digital messages from the sender;
identifying that one or more users of the social networking system have identified particular direct digital messages from the sender as unsolicited messages; or
analyzing reviews of a page on the social networking system associated with the sender.

9. The non-transitory computer readable medium of claim 8, further comprising instructions that, when executed by the at least one processor, cause the computer system to identify the crowdsourced information concerning the sender by determining one or more of:

a number of images including one or more persons posted on a timeline or page for an account of the sender;
a number of pages or users followed or liked by the sender;
a number of comments posted by the sender on timelines or pages;
a number of reactions to posts or comments attributed to the sender;
a number of profile fields including information within profile information associated with an account of the sender;
a number of birthday comments posted on a timeline or page associated with the account of the sender;
a regularity of signing in to the account; or
a time since the account was created for the sender.

10. The non-transitory computer readable medium of claim 1, further comprising instructions that, when executed by the at least one processor, cause the computer system to determine that both the sender and the first recipient and the sender and the second recipient are not directly connected by a friend relationship or a contact relationship through the social networking system.

11. A system comprising:
at least one processor; and
at least one non-transitory computer readable storage medium storing instructions that, when executed by the at least one processor, cause the system to:
receive, from a sender client device associated with a sender, a first instance of a direct digital message for delivery to a first recipient and a second instance of the direct digital message for delivery to a second recipient through a messaging application of a social networking system;
identify social-network signals and crowdsourced information concerning the sender;
generate a first relevance score representing a relevance of the first instance of the direct digital message to the first recipient based on the social-network signals and the crowdsourced information concerning the sender and a second relevance score representing a relevance of the second instance of the direct digital message to the second recipient based on the social-network signals and the crowdsourced information concerning the sender;
determine that the first relevance score and the second relevance score exceed a relevance-score threshold;
based on determining that the first relevance score and the second relevance score exceeds the relevance-score threshold, provide the first instance of the direct digital message to a first recipient client device associated with the first recipient for display within a first received-messages preview and the second instance of the direct digital message to a second recipient client device associated with the second recipient for display within a second received-messages preview;
receive an indication from the first recipient client device that the first instance of the direct digital message is unsolicited;
generate an updated second relevance score representing an updated relevance of the second instance of the direct digital message to the second recipient based on the indication that the first instance of the direct digital message is unsolicited; and
based on determining that the updated second relevance score falls below the relevance-score threshold, send a notice to the second recipient client device to remove the second instance of the direct digital message from the second received-messages preview and provide the second instance of the direct digital message for display within a sequestration folder.

12. The system of claim 11, further comprising instructions that, when executed by the at least one processor, cause the system to provide the first instance of the direct digital message to the first recipient client device for display within a first messaging-thread preview comprising a snippet of the direct digital message, a confirmation option embedded in the first messaging-thread preview to indicate the direct digital message is relevant to the first recipient, and an unsolicited-tag option embedded in the first messaging-thread preview to indicate the direct digital message is not relevant to the first recipient.

13. The system of claim 11, further comprising instructions that, when executed by the at least one processor, cause the system to:
determine updated crowdsourced information concerning the sender based on the indication from the first recipient client device that the first instance of the direct digital message is unsolicited;
based on the updated crowdsourced information concerning the sender:
update the first relevance score representing the relevance of the first instance of the direct digital message to the recipient; and
based on the updated first relevance score, send a notice to the first recipient client device associated with the first recipient to remove the first instance of the direct digital message from the first received-messages preview and to add the first instance of the direct digital message to an additional sequestration folder.

14. The system of claim 12, further comprising instructions that, when executed by the at least one processor, cause the system to receive the indication from the first recipient client device that the first instance of the direct digital message is unsolicited by receiving an indication of a selection of the unsolicited-tag option embedded in the first messaging-thread preview.

15. The system of claim 11, further comprising instructions that, when executed by the at least one processor, cause the system to:
determine a first affinity coefficient for the first recipient relative to the sender and a second affinity coefficient for the second recipient relative to the sender, the first affinity coefficient differing from the second affinity coefficient;
generate the first relevance score representing the relevance of the first instance of the direct digital message to the first recipient based on the first affinity coefficient; and
generate the second relevance score representing the relevance of the second instance of the direct digital message to the second recipient based on the second affinity coefficient, the first relevance score differing from the second relevance score.

16. The system of claim 11, further comprising instructions that, when executed by the at least one processor, cause the system to:
identify a first set of social-network actions performed by the first recipient and a second set of social-network actions performed by the second recipient;

generate the first relevance score representing the relevance of the first instance of the direct digital message to the first recipient based on the first set of social-network actions; and generate the second relevance score representing the relevance of the second instance of the direct digital message to the second recipient based on the second set of social-network actions, the first relevance score differing from the second relevance score.

17. The system of claim 11, further comprising instructions that, when executed by the at least one processor, cause the system to:

receive an additional direct digital message from an additional client device associated with an additional sender for delivery to the first recipient through the messaging application;

determine that the additional sender and the first recipient are not directly connected within the social networking system;

identify additional social-network signals for the additional sender;

generate an additional relevance score representing a relevance of the additional direct digital message to the first recipient based on the additional social-network signals;

determine that the additional relevance score falls below the relevance-score threshold; and based on determining that the additional sender and the first recipient are not directly connected within the social networking system and the additional relevance score falls below the relevance-score threshold, provide the additional direct digital message to the first recipient client device for display within an additional sequestration folder for direct digital messages instead of display within the first received-messages preview.

18. A method comprising:

receiving, from a sender client device associated with a sender, a first instance of a direct digital message for delivery to a first recipient and a second instance of the direct digital message for delivery to a second recipient through a messaging application of a social networking system;

identifying social-network signals and crowdsourced information concerning the sender;

generating a first relevance score representing a relevance of the first instance of the direct digital message to the first recipient based on the social-network signals and the crowdsourced information concerning the sender and a second relevance score representing a relevance of the second instance of the direct digital message to the second recipient based on the social-network signals and the crowdsourced information concerning the sender;

determining that the first relevance score and the second relevance score exceeds a relevance-score threshold;

based on determining that the first relevance score and the second relevance score exceeds the relevance-score threshold, providing the first instance of the direct digital message to a first recipient client device associated with the first recipient for display within a first received-messages preview and the second instance of the direct digital message to a second recipient client device associated with the second recipient for display within a second received-messages preview;

receiving an indication from the first recipient client device that the first instance of the direct digital message is unsolicited;

generating an updated second relevance score representing an updated relevance of the second instance of the direct digital message to the second recipient based on the indication that the first instance of the direct digital message is unsolicited; and based on determining that the updated second relevance score remains above the relevance-score threshold, maintaining the second instance of the direct digital message within the second received-messages preview.

19. The method of claim 18, wherein providing the first instance of the direct digital message to the first recipient client device comprises providing the first instance of the direct digital message for display within a first messaging-thread preview comprising a snippet of the direct digital message, a confirmation option embedded in the first messaging-thread preview to indicate the direct digital message is relevant to the first recipient, and an unsolicited-tag option embedded in the first messaging-thread preview to indicate the first direct digital message is not relevant to the first recipient.

20. The method of claim 19, further comprising:

determining updated crowdsourced information concerning the sender based on the indication from the first recipient client device that the first instance of the direct digital message is unsolicited;

based on the updated crowdsourced information concerning the sender:

updating the first relevance score representing the relevance of the first instance of the direct digital message to the first recipient; and based on the updated first relevance score, sending a notice to the first recipient client device associated with the first recipient to remove the first instance of the direct digital message from the first received-messages preview and to add the first instance of the direct digital message to an additional sequestration folder.

* * * * *